US012644230B2

(12) United States Patent
Laakkonen et al.

(10) Patent No.: US 12,644,230 B2
(45) Date of Patent: Jun. 2, 2026

(54) STABLE CATIONIC POLYACRYLAMIDE DISPERSIONS AND USE THEREOF IN PAPERMAKING

(71) Applicant: KEMIRA OYJ, Helsinki (FI)

(72) Inventors: Marko Laakkonen, Espoo (FI); Claudio Carletti, Helsinki (FI); Jonni Ahlgren, Espoo (FI); Valtteri Viljanen, Helsinki (FI); Edin Goletic, Helsinki (FI)

(73) Assignee: KEMIRA OYJ, Helsinki (FI)

( * ) Notice: Subject to any disclaimer, the term of this patent is extended or adjusted under 35 U.S.C. 154(b) by 224 days.

(21) Appl. No.: 18/251,179

(22) PCT Filed: Oct. 29, 2021

(86) PCT No.: PCT/US2021/057185
§ 371 (c)(1),
(2) Date: Apr. 28, 2023

(87) PCT Pub. No.: WO2022/094171
PCT Pub. Date: May 5, 2022

(65) Prior Publication Data
US 2024/0052573 A1 Feb. 15, 2024

Related U.S. Application Data

(60) Provisional application No. 63/107,749, filed on Oct. 30, 2020.

(30) Foreign Application Priority Data

Nov. 20, 2020 (FI) ..................................... 20206185

(51) Int. Cl.
*D21H 17/37* (2006.01)
*C08K 3/30* (2006.01)
*D21H 17/09* (2006.01)

(52) U.S. Cl.
CPC ............. *D21H 17/375* (2013.01); *C08K 3/30* (2013.01); *D21H 17/09* (2013.01); *C08K 2003/3054* (2013.01)

(58) Field of Classification Search
CPC ........ D21H 17/375; D21H 17/09; C08K 3/30; C08K 2003/3054
See application file for complete search history.

(56) References Cited

U.S. PATENT DOCUMENTS 5,587,415 A 12/1996 Takeda
5,938,937 A 8/1999 Sparapany et al.
(Continued)

FOREIGN PATENT DOCUMENTS

CN 103788296 5/2014
CN 107189009 9/2017
(Continued)

*Primary Examiner* — Abbas Rashid
*Assistant Examiner* — Stephen M Russell
(74) *Attorney, Agent, or Firm* — Robin L. Teskin; Baker, Donelson, Bearman, Caldwell & Berkowitz PC

(57) ABSTRACT

The present disclosure generally relates to aqueous cationic polyacrylamide (CPAM) dispersions, methods of preparation and methods of use thereof, particularly in the paper industry. For example, these CPAM dispersions may be used in any of the following: (i) sticky control in paper manufacturing (ii) fixing in paper manufacturing, (ii) sludge dewatering, and/or (iii) oil-water separation. Moreover, the present disclosure generally pertains to CPAM dispersions, wherein such CPAM dispersions are aqueous dispersions which are shelf stable at room temperature, methods of preparation and methods of use thereof in papermaking applications and in products such as paper-based products. The disclosed CPAM dispersions may be used as retention aids in papermaking processes, may increase retention of (Continued)

A

B starch to a formed paper web and/or board web, and may provide increased dry strength to paper-based products.

16 Claims, 2 Drawing Sheets

(56)                    References Cited

U.S. PATENT DOCUMENTS

| 6,248,836 | B1 * | 6/2001 | Negele | D21H 21/02 |
| | | | | 525/328.2 |
| 6,258,279 | B1 | 7/2001 | Shah et al. | |
| 2017/0268177 | A1 * | 9/2017 | Chinn | D21H 27/30 |
| 2020/0157337 | A1 * | 5/2020 | O'Toole | C09K 8/584 |

FOREIGN PATENT DOCUMENTS

| EP | 0831177 | 3/1998 |
| WO | 0165009 | 9/2001 |

* cited by examiner

A

B

STABLE CATIONIC POLYACRYLAMIDE DISPERSIONS AND USE THEREOF IN PAPERMAKING

RELATED APPLICATIONS

This application is a U.S. National Phase of Int'l Appl. No. PCT/US2021/057185 filed Oct. 29, 2021, which claims priority to U.S. Provisional Appl. No. 63/107,749 filed Oct. 30, 2020, and Finnish App. No. 2020-6185 filed Nov. 20, 2020, each and all of which are incorporated herein by reference in their entireties.

FIELD OF THE ART

The present disclosure generally relates to cationic polyacrylamide (CPAM) dispersions, articles comprising the dispersions, and methods of preparing and using the dispersions. More particularly, the present disclosure relates to aqueous CPAM dispersions which are shelf stable at room temperature and that are useful, for example, in the paper industry, including use in papermaking applications and in paper-based products.

BACKGROUND

Cationic polyacrylamide (CPAM) dispersion are commonly used as retention aids in papermaking applications to maintain adequate efficiency, drainage, and cleanliness of a paper machine, to achieve adequate Z-directional uniformity, to retain additives, including fillers, and to improve one or more strength properties of the produced paper. As such, retention aids can have a profound positive effect on the efficiency of papermaking processes and on the quality of the paper products.

CPAM polymers are generally produced by polymerization of one or more acrylamide-based monomers with one or more cationic monomers and may include one or more additional monomers which may be nonionic or anionic as long as the overall charge of the polymer is positive.

Following polymerization, CPAM polymers may be stored as dry powders. However, for storage and use as retention aids in the papermaking industry, it can be advantageous for CPAM dispersions to be in the form of homogenous aqueous dispersions which are ready to use on site and do not require agitation or mixing. Such aqueous dispersions are not thermodynamically stable and typically require additives to be kinetically stable for reasonable periods of time. Unstable CPAM dispersions may exhibit at least one of sedimentation, phase separation, and gelation, rendering them unsuitable for their intended use.

BRIEF SUMMARY

The present disclosure generally relates to an aqueous cationic polyacrylamide (CPAM) dispersion comprising:
a) at least one cationic polyacrylamide (CPAM) comprising at least one acrylamide-based monomer and at least one cationic monomer,
b) at least one polymeric stabilizer,
c) ammonium sulfate ($(NH_4)_2SO_4$),
d) sodium sulfate ($Na_2SO_4$) in an amount ranging from 1.0 wt. % to about 2.0 wt. %, preferably less than 2.0 wt. %, based on the total weight of the dispersion, and
e) water; and further wherein the aqueous dispersion is shelf stable at room temperature, optionally wherein the pH of the aqueous dispersion is less than 5.

In some embodiments, the CPAM dispersion is suitable for use as a retention aid in a papermaking process. In some embodiments, the CPAM dispersion is suitable for use in: (i) sticky control in paper manufacturing, (ii) fixing in paper manufacturing, (ii) sludge dewatering, and/or (iii) oil-water separation.

The present disclosure generally relates to an aqueous cationic polyacrylamide (CPAM) dispersion wherein
i. said at least one acrylamide-based monomer is selected from acrylamide, methacrylamide, ethylacrylamide, crotonamide, N-methyl acrylamide, N-butyl acrylamide, N-ethyl methacrylamide, and any combination thereof;
ii. said at least one CPAM polymer generally comprises from about 1 to about 15 mol % of said cationic monomer, more typically from about 5 to about 10 mol %;
iii. said at least one CPAM polymer has an average molecular weight ranging from about 3 MDa to about 20 MDa and/or has a standard viscosity (SV), ranging from 2-7 cP, more typically in the range 3.5-4.5 cP or 4.0 cP when measured as 0.1% polymer in 1 M NaCl, measured with Brookfield viscometer using UL-adapter at 60 rpm and at 25° C.;
iv. said at least one cationic monomer is selected from the group consisting of 2-(dimethylamino)ethyl acrylate methyl chloride ("Q9"), acryloyloxy ethyl trimethyl ammonium chloride ("AETAC"), methacryloyloxyethyltrimethyl ammonium chloride, methacrylamidopropyl trimethyl ammonium chloride ("MAPTAC"), acrylamidopropyltrimethyl ammonium chloride, methacryloyloxy ethyldimethyl ammonium sulfate, dimethylaminoethyl acrylate, dimethylaminopropyl methacrylamide, Q6, Q6o4, diallyldimethyl ammonium chloride ("DADMAC"); dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MSQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethyl ammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkyl ammonium halides such as diallyldiethyl ammonium chloride and diallyldimethyl ammonium chloride, and any combination thereof;

v. said cationic monomer is 2-(dimethylamino)ethyl acrylate methyl chloride ("Q9");

vi. said at least one CPAM polymer is amphoteric and further comprises at least one anionic monomer with the proviso that the CPAM polymer has an overall positive charge;

vii. said at least one CPAM polymer is amphoteric and further comprises at least one anionic monomer with the proviso that the CPAM polymer has an overall positive charge, wherein said anionic monomer is selected from the group consisting of acrylic acid, methacrylic acid, maleic acid, itaconic acid, vinyl sulfonic acid, 2-acrylamido-2-methylpropane sulfonic acid (AMPS), acrylamido methane sulfonic acid, acrylamido ethane sulfonic acid, 2-hydroxy-3-acrylamide propane sulfonic acid, styrene sulfonic acid, vinyl phosphonic acid, and combinations thereof, as well as their corresponding water soluble or dispersible alkali metal, alkaline earth metal, and ammonium salts, and any combination thereof;

viii. said CPAM dispersion has a dry solids content ranging from about 45 to about 54 wt %;

ix. said at least one polymeric stabilizer is a low molecular weight cationic polymeric stabilizer having an average molecular weight ranging from about 100 to about 2000 kg/mol;

x. said at least one polymeric stabilizer is selected from the group consisting of poly(2-(dimethylamino)ethyl acrylate methyl chloride) ("pQ9"), poly(2-(dimethylamino)ethyl methacrylate methyl chloride) ("pQ6" or "pMADAM-Cl"), poly(diallyldimethyl ammonium chloride) ("pDADMAC"), and any combination thereof;

xi. said at least one polymeric stabilizer is typically present at a concentration ranging from about 0.5 to about 10 wt %, more typically from about 0.5 to about 5 wt %, and even more typically from about 0.5 to about 2.5 wt %;

xii. said CPAM dispersion may have a dry solids content ranging from 40-60%, more typically 45-54 wt % and most typically 49-53% wherein optionally said dry solids content is affected by the CPAM polymer content, which optionally may range from about 10-30%, or from 15-20% or may be as high as 25-30%;

xiii. said polymeric stabilizer may be a low molecular weight cationic polymeric stabilizer having an average molecular weight ranging from 100-2000 kg/mol or 100-1000 kg/mol or 100-500 kg/mol;

xiv. said polymeric stabilizer may be selected from the group consisting of poly(2-(dimethylamino)ethyl acrylate methyl chloride) ("pQ9"), poly(2-(dimethylamino) ethyl methacrylate methyl chloride) ("pQ6" or "pMADAM-Cl"), poly(diallyldimethyl ammonium chloride) ("pDADMAC"), and any combination thereof;

xv. said polymeric stabilizer may be present at a concentration ranging from about 0.5 to about 10 wt %, typically from about 0.5 to about 5 wt %, and more typically from about 0.5 to about 2.5 wt %;

xvi. said (NH4)2SO4 may be present at a concentration ranging from about 10.0 to about 40.0 wt % or 15-35% or from about 15.0 to about 30 wt % or less than 20 wt % optionally if the polymerization reaction system contains readily precipitating hydrophobic monomers;

xvii. said CPAM dispersion may further comprise an acid, e.g., citric acid, adipic acid or acetic acid;

xviii. said CPAM dispersion optionally may further comprise an additive selected from sodium-1-naphthalene sulfonate ("SNS"), sodium xylene sulfonate ("SXS"), sodium toluene sulfonate ("STS"), and any combination thereof;

xix. the $(NH_4)_2SO_4$ is generally present at a concentration ranging from about 10.0 to about 40.0 wt %, more typically from about 15.0 to about 30 wt %;

xx. the CPAM dispersion has a pH of about 4.0;

xxi. the CPAM dispersion further comprises citric acid;

xxii. the CPAM dispersion further optionally comprises at least one additive selected from sodium-1-naphthalene sulfonate ("SNS"), sodium xylene sulfonate ("SXS"), sodium toluene sulfonate ("STS"), and any combination thereof;

xxiii. the CPAM dispersion further optionally comprises at least one co-stabilizer, e.g., glycerol;

xxiv. the CPAM dispersion further comprises at least one chelating agent, e.g., EDTA-2Na;

xxv. the CPAM dispersion does not comprise fumed silica; and/or xxvi. a combination of any two or more or (i)-(xviii).

The present disclosure also generally relates to an aqueous cationic polyacrylamide (CPAM) dispersion as above described, wherein said aqueous dispersion is shelf stable at room temperature for at least 1 day, at least 2 days, at least 3 days, at least 4 days, at least 5 days, at least 10 days, at least 15 days, at least 20 days, at least 25 days, at least 30 days, at least 35 days, at least 40 days, at least 45 days, at least 50 days, at least 55 days, at least 60 days, or at least 65 days, at least 2, 3, 4, 5, 6, 7, 8, 9, 10 months or up to a year or more.

The present disclosure also generally relates to an aqueous cationic polyacrylamide (CPAM) dispersion as above described, wherein said aqueous dispersion is demonstrated to be shelf stable at room temperature by (i) exposing the aqueous dispersions for 8 hrs at 40° C.+16 hrs at 5° C. and repeating this cycle, optionally two times, and further optionally centrifuging after such exposure, wherein stable aqueous dispersions tested under such conditions exhibit no discernible effect on the dispersion, and wherein optionally the particle morphology of aqueous dispersions tested under such temperature stability testing conditions show no discernable changes in particle morphology and/or (ii) centrifuging at 6000 rpm for 15 min in a Heraeus Megafuge 2.0 wherein stable aqueous dispersions will be substantially homogenous and flow smoothly after centrifugation, whereas unstable dispersions will have phase separation and may form gels.

The present disclosure generally relates to an aqueous cationic polyacrylamide (CPAM) dispersion as above described, wherein:

(i) the free radical initiators are all compounds which have a half-life of less than 3 hours at the selected polymerization temperature;

(ii) if polymerization is started at a relatively low temperature and completed at a higher temperature, two or more initiators which decompose at different temperatures are used, i.e. an initiator is first used which decomposes at a lower temperature to initiate the polymerization followed by the addition of a second initiator which completes the polymerization and which decomposes at a higher temperature;

(iii) water-soluble or water-insoluble initiators or mixtures of water-soluble or water-insoluble initiators are used to initiate polymerization;

(iv) water-insoluble initiators are used which are soluble in the organic phase;

(v) if polymerization includes a temperature range from about 40° to 60° C. then one or more of the following initiators are used: Acetylcyclohexanesulfonyl peroxide, diacetylperoxydicarbonate, dicylcohexylperoxydicarbonate, di-2-ethylhexyl peroxydicarbonate, tert-butyl perneodecanoate, 2,2-azobis-(4-methoxy-2, 4-dimethylvaleronitrile), 2,2'-azobis-(2-methyl-N-phenylpropionamidine) dihydrochloride, or 2,2'-azobis-(2-methylpropionamidine) dihydrochloride;

(vi) if polymerization includes a temperature range from about 60° to 80° C. then one or more of the following initiators are optionally used: tert-Butyl perpivalate, dioctanoyl peroxide, dilauaroyl peroxide, or 2,2'-azobis-(2,4-dimethylvaleronitrile);

(vii) if polymerization includes a temperature range from 80° to 100° C. then optionally one or more of the following initiators are used: Dibenzoyl peroxide, tert-butyl per-2-ethylhexanoate, tert-butyl permaleate, 2,2'-azobisisobutyronitrile, dimethyl-2,2'-azobisisobutyrate, sodium persulfate, potassium persulfate, or ammonium persulfate;

(viii) if polymerization includes a temperature range from about 100° to 120° C. then optionally one or more of the following initiators are used: Bis-(tert-butylperoxy)-cyclohexane, tert-butyl peroxyisopropylcarbonate, tert-butyl peracetate, or hydrogen peroxide;

(ix) if polymerization includes a temperature range from about 120° to 140° C. then optionally one or more of the following initiators are used: 2,2-Bis-(tert-butylperoxy)-butane, dicumyl peroxide, di-tert-amyl peroxide, or di-tert-butyl peroxide;

(x) if polymerization includes a temperature of >140° C. then optionally one or more of the following initiators are used: p-Menthane hydroperoxide, pinane hydroperoxide, cumene hydroperoxide or tert-butyl hydroperoxide.

The present disclosure also generally relates to an aqueous cationic polyacrylamide (CPAM) dispersion as above described, wherein the polymerization includes a temperature range from about 40° to 60° C. and one or more of the following initiators are used: Acetylcyclohexanesulfonyl peroxide, diacetylperoxydicarbonate, dicylcohexylperoxydicarbonate, di-2-ethylhexyl peroxydicarbonate, tert-butyl perneodecanoate, 2,2-azobis-(4-methoxy-2,4-dimethylvaleronitrile), 2,2'-azobis-(2-methyl-N-phenylpropionamidine) dihydrochloride, 2,2'-azobis-(2-methylpropionamidine) dihydrochloride; and/or the polymerization includes a temperature range from about 60° to 80° C. and one or more of the following initiators are used: tert-Butyl perpivalate, dioctanoyl peroxide, dilauaroyl peroxide, or 2,2'-azobis-(2,4-dimethylvaleronitrile);

The present disclosure contemplates the use of the CPAM dispersion in any of the following applications: (i) sticky control in paper manufacturing (ii) fixing in paper manufacturing, (ii) sludge dewatering, and/or (iii) oil-water separation.

The present disclosure particularly relates to the use of the CPAM dispersion according to any one of the foregoing as a retention aid in a papermaking process, optionally wherein the CPAM dispersion increases retention of starch to a formed paper web and/or board web and/or wherein the CPAM dispersion increases at least one strength property of the formed paper web and/or board web, such as burst strength, short span compression (SCT) and/or tensile strength.

The present disclosure also generally relates to the use of a paper product comprising the CPAM dispersion according to any of the foregoing, optionally wherein said paper product:

i. comprises at least one paper layer or web containing the CPAM dispersion;

ii. comprises the CPAM dispersion on at least one surface of the paper product;

iii. comprises one or more of paper sheeting, paperboard, tissue paper, and wall board;

iv. comprises one or more of Kraft paper, sulfite paper, semi-chemical paper and the like, including paper produced using bleached pulp, unbleached pulp, or combinations thereof;

v. comprises a fiber-based product;

vi. comprises one or more of handsheets, board-based products, beverage carriers, toweling, milk and juice cartons, food trays, paper bags, liner board for corrugated containers, packaging board grade, and tissue and towel grade, paper materials, paper towels, diapers, sanitary napkins, training pants, pantiliners, incontinence briefs, tampons, pee pads, litter box liners, coffee filters, air filters, dryer pads, floor cleaning pads, absorbent facial tissue, absorbent bathroom tissue, napkins, wrapping paper, and/or other paperboard products such as cartons and bag paper;

vii. comprises cellulose paperboard webs which optionally comprise predominantly cellulose fibers;

viii. comprises cellulose fibers and from about 0.02% to about 10% CPAM by dry weight of cellulose fibers, optionally in the range of about 0.05 wt % to 5 wt % of the dry weight of cellulose fibers;

ix. comprises an improved paper strength, e.g. as determined by STFI testing, compared to a paper product that does not comprise said CPAM dispersion;

x. comprises an improved paper strength, e.g. as determined by burst strength testing, compared to a paper product that does not comprise said CPAM dispersion; and/or xi. a combination of any two or more of (i)-(x).

The present disclosure also generally relates to a method of papermaking, wherein said method comprises adding one or more CPAM dispersions according to any one of the foregoing during the papermaking method in an amount effective to increase the dry strength of paper products produced by said method, wherein:

i. the one or more CPAM dispersions is added to a composition comprising fiber and/or pulp used in the method prior to the paper product being formed; and/or ii. the one or more CPAM dispersions is added to one or more surfaces of the paper product after the paper product is formed.

The present disclosure also generally relates to a method of manufacturing one or more paper products, wherein said method comprises: a. providing a composition comprising predominantly cellulose fibers; b. adding a predetermined quantity of one or more CPAM dispersions according to any one of the foregoing; and c. forming the desired paper product.

The present disclosure also generally relates to a method for strengthening paper, comprising contacting pulp fibers with a strengthening resin comprising at least one CPAM dispersion according to any one of the foregoing, and at least partially curing the strengthening resin contacting the pulp fibers to produce a paper product of enhanced strength.

The present disclosure also generally relates to a method or use according to any one of the foregoing, wherein:

i. said CPAM dispersion is added at the wet end of a paper-making facility to a cellulose fiber suspension;

ii. said CPAM dispersion is added in an amount from about 0.02% by dry weight to about 10% by dry weight of the cellulose fibers, optionally in the range of about 0.05 wt % to 5 wt % of the dry weight of the cellulose fibers;

iii. said CPAM dispersion is added before, during and/or after the paper product is formed;

iv. said CPAM dispersion is added to one or more surfaces of the paper product after the paper product is formed;

v. said CPAM dispersion provides a paper strength enhancement to the paper product for at least one strength property, such as burst strength, short span compression (SCT) and/or tensile strength, e.g., as determined by STFI testing;

vi. said CPAM dispersion provides a paper strength enhancement to the paper product for at least one strength property, such as burst strength, short span compression (SCT) and/or tensile strength, e.g., as determined by burst strength testing;

vii. the paper product comprises one or more of hand-sheets, board-based products, beverage carriers, toweling, milk and juice cartons, food trays, paper bags, liner board for corrugated containers, packaging board grade, and tissue and towel grade, paper materials, paper towels, diapers, sanitary napkins, training pants, pantiliners, incontinence briefs, tampons, pee pads, litter box liners, coffee filters, air filters, dryer pads, floor cleaning pads, absorbent facial tissue, absorbent bathroom tissue, napkins, wrapping paper, and/or other paperboard products such as cartons and bag paper;

viii. the paper product comprises cellulose paperboard webs which optionally comprise predominantly cellulose fibers; and/or ix. a combination of any two or more of (i)-(viii).

The present disclosure also generally relates to a method for preparing an aqueous CPAM dispersion according to any one of the foregoing, comprising: polymerizing said at least one acrylamide-based monomer and said at least one cationic monomer in a polymerization reaction comprising water, said acrylamide-based monomer, said cationic monomer, said at least one polymeric stabilizer, (NH4)2SO4 ("ammonium sulfate"), Na2SO4 ("sodium sulfate"), and at least one polymerization initiator to form said CPAM dispersion comprising said at least one CPAM polymer, wherein:

i. the Na2SO4 is present at a concentration which is less than about 3.0 wt %, more typically at least 1.0 wt % and less than 2.0 wt %;

ii. the method optionally further comprises measuring pH of the polymerization reaction and adjusting the pH to less than 5.0 by adding at least one acid if the measured pH value is 5.0 or more; and iii. wherein the prepared aqueous CPAM dispersion is an aqueous dispersion which is shelf stable at room temperature; optionally wherein the polymerizing is performed in a reaction vessel and the method further comprises purging the reaction vessel and/or the polymerization reaction with nitrogen;

iv. the polymerizing further comprises agitation of the polymerization reaction at about 200-300 rpm;

v. the polymerizing is performed at a controlled temperature ranging from about 38° C. to about 50° C.;

vi. the pH is adjusted to about 4.0;

vii. said at least one acid comprises citric acid, adipic acid or acetic acid; or comprises citric acid;

viii. said at least one initiator is selected from an azo compound such as 2,2'-azobis(2-amidinopropane) dihydrochloride, 2,2'-azobis[2-(2-imidazolin-2-yl)propane] dihydrochloride, 2,2'-azobis(isobutyronitrile) (AIBN), 2,2'-azobis(2,4-dimethylvaleronitrile) (AIVN), 2,2'-azobis(2-methylpropionamidine) dihydrochloride, or comprises a peroxide initiator such as bentsoyl peroxide, t-butyl peroxide, t-butyl hydroperoxide and t-butyl perbenzoate or comprises sodium bromate/sulfur dioxide, potassium persulfate/sodium sulfite, or ammonium persulfate/sodium sulfite, or comprises a combination of any of the foregoing;

ix. said initiator is 2,2'-azobis[2-(2-imidazolin-2-yl)propane] dihydrochloride;

x. progress of the polymerization reaction is monitored;

xi. the at least one initiator is added in one or more doses throughout the polymerization reaction, such as two doses, three doses, four doses, or five doses;

xii. the total amount of the at least one initiator added during the polymerization reaction generally ranges from about 200 to about 600 wppm per monomer, more typically ranges from about 300 to about 500 wppm per monomer, and most typically ranges from about 350 to about 400 wppm per monomer, and/or xiii. a combination of any two or more of (i)-(xii).

The present disclosure also generally relates to a method for preparing an aqueous CPAM dispersion according to any one of the foregoing, comprising: combining water, said at least one CPAM polymer, said at least one polymeric stabilizer, (NH4)2SO4 ("ammonium sulfate"), and Na2SO4 ("sodium sulfate"), wherein:

i. the Na2SO4 is present at a concentration which is less than about 3.0 wt %, more typically at least 1.0 wt % and less than 2.0 wt %;

ii. the method further optionally comprises measuring pH of the CPAM dispersion and adjusting the pH to less than 5.0 by adding at least one acid if the measured pH value is 5.0 or more; and iii. wherein the prepared aqueous CPAM dispersion is an aqueous dispersion which is shelf stable at room temperature.

The present disclosure also generally relates to an aqueous CPAM dispersion prepared by any one of the foregoing methods.

The present disclosure also relates to compositions comprising a CPAM dispersion as described herein which composition results from the use thereof in any of the following applications: (i) sticky control in paper manufacturing (ii) fixing in paper manufacturing, (ii) sludge dewatering, and/or (iii) oil-water separation.

The present disclosure also specifically relates to a paper product comprising a CPAM dispersion prepared by any one of the foregoing methods.

DETAILED DESCRIPTION

I. Overview

Figure 1:
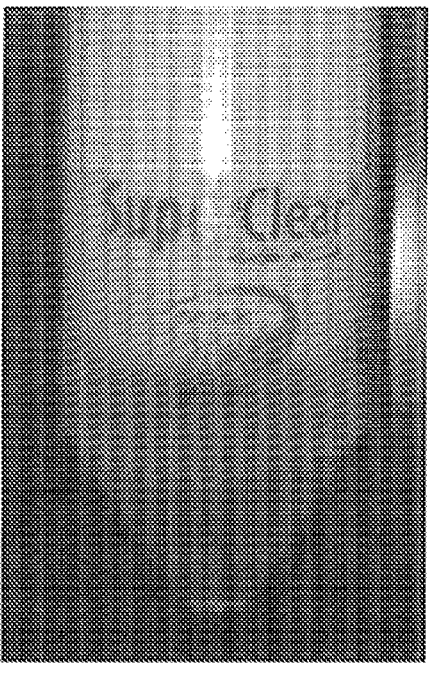
FIG. 1A is a photograph of an unstable (i.e., separated) aqueous CPAM dispersion after centrifugation testing for 15 min at 6000 rpm.
FIG. 1B is a photograph of a stable (i.e., homogenous) aqueous CPAM dispersion after centrifugation testing for 15 min at 6000 rpm.
Figure 1:
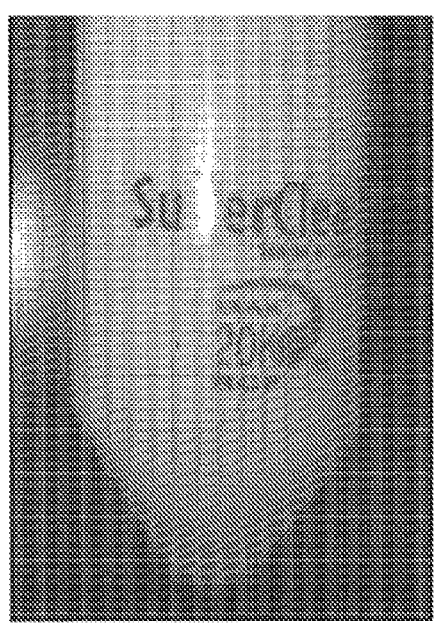

CPAM dispersions have known usage, for example, in the paper industry, typically as retention aids and dry strengthening agents. Also, CPAM dispersions may be used for (i) sticky control in paper manufacturing (ii) fixing in paper manufacturing, (ii) sludge dewatering, and/or (iii) oil-water separation. However, aqueous dispersions of conventional CPAM dispersions may separate and form gels at room temperature. As such, it is an object of the present disclosure to provide improved aqueous CPAM dispersions which are shelf stable at room temperature and methods of preparation and use thereof.

According to a first aspect of the present disclosure, there is provided an aqueous cationic polyacrylamide (CPAM) dispersion that is a homogenous shelf-stable dispersion at room temperature.

According to a second aspect of the present disclosure, there is provided use of said CPAM dispersion as a retention aid in papermaking processes or in any of the following: (i) sticky control in paper manufacturing (ii) fixing in paper manufacturing, (ii) sludge dewatering, and/or (iii) oil-water separation.

According to a third aspect of the present disclosure, there is provided a paper product comprising said CPAM dispersion.

According to a fourth aspect of the present disclosure, there is provided a method of papermaking.

According to a fifth aspect of the present disclosure, there is provided a method of manufacturing one or more paper products comprising said CPAM dispersion.

According to a sixth aspect of the present disclosure, there is provided a method of strengthening paper.

According to a seventh aspect of the present disclosure, there is provided methods for preparing said CPAM dispersion.

It is contemplated that any embodiment discussed in this specification can be implemented with respect to any method, kit, reagent, or dispersion of the disclosure, and vice versa. Furthermore, dispersions of this disclosure can be used to achieve methods of the disclosure.

It will be understood that particular embodiments described herein are shown by way of illustration and not as limitations. The principal features of this disclosure can be employed in various embodiments without departing from the scope of the disclosure. Those skilled in the art will recognize, or be able to ascertain, using no more than routine experimentation, numerous equivalents to the specific procedures described herein. Such equivalents are considered to be within the scope of this disclosure and are covered by the appended claims.

All publications and patent applications mentioned in the instant specification are indicative of the level of skill of one skilled in the art to which this disclosure pertains. All publications and patent applications are herein incorporated by reference to the same extent as if each individual publication or patent application was specifically and individually indicated to be incorporated by reference.

All technical and scientific terms used herein have the same meaning as commonly understood to one of ordinary skill in the art to which this disclosure belongs unless clearly indicated otherwise. In the event that there are a plurality of definitions for terms herein, those in this section prevail.

Where reference is made to a URL or other such identifier or address, it is to be understood that such identifiers can change and particular information on the internet can come and go, but equivalent information can be found by searching the internet. Reference thereto evidences the availability and public dissemination of such information.

As used herein, the singular forms "a," "an," and "the" may mean "one" but also include plural referents such as "one or more" and "at least one" unless the context clearly dictates otherwise.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 8, 9, 10, 11, 12, 13, 14, or 15%.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, and/or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein the term "initiator" or "polymerization initiator" generally refers to a compound which acts as a source of any chemical species that reacts with a monomer or monomers (molecule or molecules that can form chemical bonds) to form an intermediate compound or free radical capable of linking successively with a large number of other monomers to produce a polymeric compound. Initiator amounts used in polymerization processes levels often may be varied in order to produce polymers of a desired molecular weight. Initiators may include thermal and redox initiators. Exemplary initiators include azo compounds such as 2,2'-azobis(2-amidinopropane) dihydrochloride, 2,2'-azobis [2-(2-imidazolin-2-yl)propane] dihydrochloride (V-044, Wako pure chemical industries), 2,2'-azobis(isobutyronitrile) (AIBN), 2,2'-azobis(2,4-dimethylvaleronitrile) (AIVN), 2,2'-azobis(2-methylpropionamidine)dihydrochloride (V-50 Wako pure chemical industries) and the like, or peroxide initiators, for example bentsoyl peroxide, t-butyl peroxide, t-butyl hydroperoxide and t-butyl perbenzoate. Other initiators include sodium bromate/sulfur dioxide, potassium persulfate/sodium sulfite, and ammonium persulfate/sodium sulfite, as well as initiators disclosed in U.S. Pat. No. 4,473,689.

Exemplary free radical initiators herein will comprise initiator compounds which have a half-life of less than 3 hours at the particular polymerization temperature chosen and which typically are water soluble. Also, if the polymerization is started at a relatively low temperature, and completed at a higher temperature, in some exemplary embodiments it may be advantageous to employ two or more initiators which decompose at different temperatures, e.g., to first use an initiator which decomposes at a lower temperature in order to initiate the polymerization, and then to complete the main polymerization using an initiator which decomposes at a higher temperature.

Various water-soluble or water-insoluble initiators or mixtures of water-soluble or water-insoluble initiators may be used. The water-insoluble initiators which alternatively or additionally are used in combination with one or more water soluble initiators generally are soluble in the particular organic phase.

The choice of polymerization initiator or initiators will further be influenced by the polymerization temperature. It is well known in the art that in general a particular polymerization initiator will be efficacious or more efficacious at a specific temperature range. One skilled in polymerization therefore, depending on the polymerization temperature conditions, will be able to select suitable polymerization initiators which are appropriate under these temperature conditions.

A non-exhaustive list of polymerization initiators which may be selected for use at different temperature ranges are provided below. It should be understood that these are exemplary and not exhaustive of polymerization initiators which may be used alone or in combination with other polymerization initiators at the recited or alternative temperature ranges.

Temperature Range: From ≈40° to ≈60° C.

Acetylcyclohexanesulfonyl peroxide, diacetylperoxydicarbonate, dicylcohexylperoxydicarbonate, di-2-ethylhexyl peroxydicarbonate, tert-butyl perneodecanoate, 2,2-azobis-(4-methoxy-2,4-dimethylvaleronitrile), 2,2'-azobis-(2-methyl-N-phenylpropionamidine) dihydrochloride, and 2,2'-azobis-(2-methylpropionamidine) dihydrochloride.

Temperature: From ≈60° to ≈80° C.

Tert-Butyl perpivalate, dioctanoyl peroxide, dilauaroyl peroxide, and 2,2'-azobis-(2,4-dimethylvaleronitrile).

Temperature: From ≈80° to ≈100° C.

Dibenzoyl peroxide, tert-butyl per-2-ethylhexanoate, tert-butyl permaleate, 2,2'-azobisisobutyronitrile, dimethyl-2,2'-azobisisobutyrate, sodium persulfate, potassium persulfate, and ammonium persulfate.

Temperature: From ≈100° to ≈120° C.

Bis-(tert-butylperoxy)-cyclohexane, tert-butyl peroxyisopropylcarbonate, tert-butyl peracetate, and hydrogen peroxide.

Temperature: From ≈120° to ≈140° C.

2,2-Bis-(tert-butylperoxy)-butane, dicumyl peroxide, di-tert-amyl peroxide, and di-tert-butyl peroxide.

Temperature: >≈140° C.

p-Menthane hydroperoxide, pinane hydroperoxide, cumene hydroperoxide and tert-butyl hydroperoxide.

Preferred initiators which may be used in the polymerization methods disclosed herein include in particular azo compound initiators, particularly 2,2'-azobis[2-(2-imidazolin-2-yl)propane] dihydrochloride.

When we refer to a "%" in relation to a compound or composition (aqueous dispersion) it generally means "wt. %" or "% by wt." or refers to mol. %.

As used herein, the term "monomer" generally refers to nonionic monomers, anionic monomers, cationic monomers, zwitterionic monomers, betaine monomers, and other amphoteric ion pair monomers.

As used herein, the terms "polymer," "polymers," "polymeric," and similar terms are used in their ordinary sense as understood by one skilled in the art, and thus may be used herein to refer to or describe a large molecule (or group of such molecules) that comprise recurring units. Polymers may be formed in various ways, including by polymerizing monomers and/or by chemically modifying one or more recurring units of a precursor polymer. Unless otherwise specified, a polymer may comprise a "homopolymer" that may comprise substantially identical recurring units that may be formed by various methods e.g., by polymerizing a particular monomer. Unless otherwise specified, a polymer may also comprise a "copolymer" that may comprise two or more different recurring units that may be formed by, e.g., copolymerizing, two or more different monomers, and/or by chemically modifying one or more recurring units of a precursor polymer. Unless otherwise specified, a polymer or copolymer may also comprise a "terpolymer" that may comprise polymers that may comprise three or more different recurring units. The term "polymer" as used herein is intended to include both the acid form of the polymer as well as its various salts. Polymers may be amphoteric in nature, i.e., containing both anionic and cationic substituents, although not necessarily in the same proportions.

As used herein the term "nonionic monomer" generally refers to a monomer that possesses a neutral charge.

As used herein "amphoteric polymers" refers to polymers comprising both cationic and anionic monomers.

As used herein, the term "anionic monomer" means a monomer which possesses a net negative charge. In some embodiments, anionic monomers include anionic vinyl monomers, and may comprise e.g., a carboxylic acid functional group, a sulfonic acid functional group, a phosphonic acid functional group, and their corresponding water-soluble salts, or any combination thereof. In some embodiments, anionic monomers may comprise e.g., acrylic acid, methacrylic acid, maleic acid, itaconic acid, vinyl sulfonic acid, 2-acrylamido-2-methylpropane sulfonic acid (AMPS), acrylamido methane sulfonic acid, acrylamido ethane sulfonic acid, 2-hydroxy-3-acrylamide propane sulfonic acid, styrene sulfonic acid, vinyl phosphonic acid, and combinations thereof, as well as their corresponding water soluble or dispersible alkali metal, alkaline earth metal, and ammonium salts, and any combinations thereof.

Representative water soluble anionic monomers include acrylic acid, methacrylic acid, 2-acrylamido-2-methyl-1-propanesulfonic acid, acrylamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide and the water soluble alkali metal, alkaline earth metal, and ammonium salts thereof.

As used herein, the term "cationic monomer" refers to a monomer that possesses a positive charge. Cationic monomers may comprise e.g., those comprising acryloyloxy ethyl trimethyl ammonium chloride ("AETAC"), methacryloyloxyethyltrimethyl ammonium chloride, methacrylamidopropyltrimethyl ammonium chloride ("MAPTAC"), acrylamidopropyltrimethyl ammonium chloride, methacryloyloxyethyldimethyl ammonium sulfate, dimethylaminoethyl acrylate, dimethylaminopropylmethacrylamide, Q6, Q6o4, and/or diallyldimethyl ammonium chloride ("DADMAC"). In some embodiments, the cationic monomer comprises dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MSQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethyl ammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethyl ammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkyl ammonium halides such as diallyldiethyl ammonium chloride and diallyldimethyl ammonium chloride. Alkyl groups may generally comprise e.g., those comprising $C_{1-8}$ alkyl groups. In some embodiments, cationic monomers may comprise quaternary ammonium or acid salts of vinyl amide, vinyl carboxylic acid, methacrylate and their derivatives. Cationic monomers can be combined, for example, to form a terpolymer of dimethylaminoethylmethacrylate methyl chloride quaternary salt, and diallyldimethyl ammonium chloride and acrylamide.

As used herein, "acrylamide-based monomer" generally refers to acrylamide or a monomer which is derived from acrylamide, including but not limited to methacrylamide, ethylacrylamide, crotonamide, N-methyl acrylamide, N-butyl acrylamide, or N-ethyl methacrylamide.

As used herein, "room temperature" means 20° C. or ≈20° C.

As used herein, "shelf-stable" and "shelf stable" refers to the shelf stability of an aqueous CPAM dispersion under specific conditions, e.g., at specific temperatures to which the dispersion may be exposed during storage, e.g., room temperature (≈20° C.) and/or at temperatures of ≈50° C. or higher, ≈40° C., ≈30° C., ≈25° C., ≈10° C., ≈5° C. or lower. These temperatures should be understood to be exemplary of temperature conditions that the CPAM dispersions of the invention may be exposed to during storage and/or may be assessed for temperature stability, e.g., after prolonged storage.

As disclosed herein in exemplary embodiments shelf stability of the subject aqueous CPAM dispersions may be assessed by exposing aqueous dispersions to temperature stability testing, i.e., wherein the aqueous dispersion is exposed to different temperature conditions in order to assess temperature stability, e.g., at room temperature.

In exemplary embodiments, the temperature sensitivity of CPAM dispersions is evaluated at high and/or low temperatures. An exemplary test for evaluating temperature stability comprises exposing aqueous CPAM dispersions as disclosed herein for 8 hrs at 40° C.+16 hrs at 5° C. and repeating this cycle two times. As disclosed herein, after such exposure and centrifugation, i.e., after such a three day's temperature sensitivity testing, aqueous dispersions as disclosed herein exhibited no discernible effect on the dispersion, i.e., they were stable under the tested temperature conditions. Moreover, the particle morphology of aqueous dispersions tested under such temperature stability testing when compared (before and after temperature stability testing) under microscopy similar showed no discernable changes further evidencing that the subject aqueous dispersions are stable under the tested temperature conditions.

In some embodiments, the shelf stability of the disclosed CPAM dispersions alternatively or in addition may be determined by centrifugation at 6000 rpm for 15 min in a Heraeus Megafuge 2.0 which is equivalent to a shelf life of 65 days under normal gravity of Earth. Stable aqueous dispersions are homogenous and flow smoothly after centrifugation, whereas unstable dispersions will have phase separation and may form gels.

CPAM dispersions tested under such conditions show no appreciable negative impact to stability and particle morphology is unchanged and remain these dispersions remain stable even after prolonged storage and/or after being subjected to different temperature conditions. In some embodiments, CPAM dispersions tested by the afore-described stability testing or other stability testing methods, are shelf stable at room temperature for prolonged periods after preparation, i.e., at least 10 days, at least 15 days, at least 20 days, at least 25 days, at least 30 days, at least 35 days, at least 40 days, at least 45 days, at least 50 days, at least 55 days, at least 60 days, or at least 65 days, at least 3, 4, 5, 6, 7, 8, 9, 10 months or even up to a year or more after preparation. Indeed, it has been shown that CPAM dispersions of the present disclosure which have passed the centrifugation test disclosed above are perfectly stable for more than 6-10 months after preparation.

As used herein, "retention aid" refers to chemical additives and agents, such as the disclosed CPAM dispersions, which improve the retention of cationic starch to fibers and thus improve the strength properties of the produced paper and/or paper products.

As used herein, the terms "papermaking process" and "papermaking application" generally refer to any process in which any form of paper and/or paperboard product may be produced. For example, such processes include making paper products from pulp, such as methods comprising forming an aqueous cellulosic papermaking furnish, draining the furnish to form a sheet, and drying the sheet. The steps of forming the papermaking furnish, draining and drying may be carried out in any conventional manner generally known in the art.

II. Aqueous Shelf-Stable CPAM Dispersions

The present disclosure generally relates to an improved aqueous dispersion which is preferably suitable for use as a retention aid and/or dry strengthening agent, wherein said aqueous dispersion comprises:

a) at least one cationic polyacrylamide (CPAM) comprising at least one acrylamide-based monomer and at least one cationic monomer, b) at least one polymeric stabilizer, c) ammonium sulfate $((NH_4)_2SO_4)$, d) sodium sulfate $(Na_2SO_4)$ in an amount ranging from 1.0 wt. % to about 2.0 wt. %, preferably less than 2.0 wt. %, based on the total weight of the dispersion, and e) water;

wherein the aqueous dispersion is shelf stable at room temperature; and wherein optionally the pH of the aqueous dispersion is less than 5, and further optionally wherein shelf stability of the aqueous dispersion at room temperature is optionally assessed according to the exemplary afore-described temperature stability and/or centrifugation stability testing methods.

As shown herein such CPAM dispersions are useful in papermaking processes and possess improved storage properties that are expected to provide for improved shelf stability compared to conventional CPAM dispersions. For example, in some instances, conventional aqueous CPAM dispersions may separate and/or form gels, whereas in some embodiments, the CPAM dispersion disclosed herein may be an aqueous dispersion which is shelf stable at room temperature for at least 1 day, at least 2 days, at least 3 days, at least 4 days, at least 5 days, at least 10 days, at least 15 days, at least 20 days, at least 25 days, at least 30 days, at least 35 days, at least 40 days, at least 45 days, at least 50 days, at least 55 days, at least 60 days, or at least 65 days or at least 1, 2, 3, 4, 5, 6, 7, 8, 9, 10 months or a year or more after preparation.

Said acrylamide-based monomer may be any acrylamide-based monomer known in the art. For example, in some embodiments, said acrylamide-based monomer may be selected from acrylamide, methacrylamide, ethylacrylamide, crotonamide, N-methyl acrylamide, N-butyl acrylamide, N-ethyl methacrylamide, and any combination thereof.

In some embodiments, said CPAM polymer may be a low cationic polymer comprising from about 1 to about 15 mol % of at least one cationic monomer, typically from about 5 to about 10 mol %.

In some embodiments, said CPAM polymer may have an average molecular weight ranging from about 5 MDa to about 20 MDa.

In some embodiments, said cationic monomer may be any cationic monomer known in the art. For example, in some embodiments, said cationic monomer may be selected from the group consisting of 2-(dimethylamino)ethyl acrylate methyl chloride ("Q9"), acryloyloxy ethyl trimethyl ammonium chloride ("AETAC"), methacryloyloxyethyltrimethyl ammonium chloride, methacrylamidopropyl trimethyl ammonium chloride ("MAPTAC"), acrylamidopropyltrimethyl ammonium chloride, methacryloyloxy ethyldimethyl ammonium sulfate, dimethylaminoethyl acrylate, dimethylaminopropyl methacrylamide, Q6, Q6o4, diallyldimethyl ammonium chloride ("DADMAC"); dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MSQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethyl ammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkyl ammonium halides such as diallyldiethyl ammonium chloride and diallyldimethyl ammonium chloride, and any combination thereof.

In some embodiments, said cationic monomer may be 2-(dimethylamino)ethyl acrylate methyl chloride ("Q9").

In some embodiments, said CPAM polymer may be amphoteric and may further comprise at least one anionic monomer with the proviso that the CPAM polymer has an overall positive charge. Said anionic monomer may be any anionic monomer known in the art. For example, said anionic monomer may be selected from the group consisting of acrylic acid, methacrylic acid, maleic acid, itaconic acid, vinyl sulfonic acid, 2-acrylamido-2-methylpropane sulfonic acid (AMPS), acrylamido methane sulfonic acid, acrylamido ethane sulfonic acid, 2-hydroxy-3-acrylamide propane sulfonic acid, styrene sulfonic acid, vinyl phosphonic acid, and combinations thereof, as well as their corresponding water soluble or dispersible alkali metal, alkaline earth metal, and ammonium salts, or any combination thereof.

In some embodiments, said CPAM dispersion may have a dry solids content ranging from 40-60%, more typically 45-54 wt % and most typically 49-53%. The dry solids content is affected by the CPAM polymer content, which in exemplary embodiments may range from about 10-30%, and more typically will range from 15-20%. In some embodiments the CPAM content may be as high as 25-30%.

In some embodiments, said polymeric stabilizer may be a low molecular weight cationic polymeric stabilizer having an average molecular weight ranging from 100-2000 kg/mol or 100-1000 kg/mol or 100-500 kg/mol. In some embodiments, said polymeric stabilizer may be selected from the group consisting of poly(2-(dimethylamino)ethyl acrylate methyl chloride) ("pQ9"), poly(2-(dimethylamino)ethyl methacrylate methyl chloride) ("pQ6" or "pMADAM-Cl"), poly(diallyldimethyl ammonium chloride) ("pDADMAC"), and any combination thereof.

In some embodiments, said polymeric stabilizer may be present at a concentration ranging from about 0.5 to about 10 wt %, typically from about 0.5 to about 5 wt %, and more typically from about 0.5 to about 2.5 wt %.

In some embodiments, said $(NH_4)_2SO_4$ may be present at a concentration ranging from about 10.0 to about 40.0 wt % or 15-35% and typically ranges from about 15.0 to about 30 wt %. Less than 20 wt % ammonium sulfate levels are suitable, e.g., if the polymerization reaction system contains readily precipitating hydrophobic monomers.

In some embodiments, said CPAM dispersion may have a pH of about 4.0.

In some embodiments, said CPAM dispersion may further comprise an acid, e.g., citric acid, adipic acid or acetic acid.

In some embodiments, said CPAM dispersion may further comprise an additive selected from sodium-1-naphthalene sulfonate ("SNS"), sodium xylene sulfonate ("SXS"), sodium toluene sulfonate ("STS"), and any combination thereof.

In some embodiments, said CPAM dispersion may further comprise a co-stabilizer, e.g., glycerol.

In some embodiments, said CPAM dispersion may optionally further comprise a chelating agent, e.g., EDTA-2Na.

In some embodiments, said CPAM dispersion may optionally not comprise fumed silica.

The CPAM dispersions disclosed herein generally are in the form of an aqueous dispersion which is shelf stable for prolonged duration at room temperature when assessed under the afore-disclosed temperature and/or centrifugation methods. As noted previously in exemplary embodiments the stability of the dispersions under different temperature conditions may be determined by exposing the CPAM dispersion to 8 hrs at 40° C.+16 hrs at 5° C. and repeating this temperature cycle times followed by centrifugation and thereafter assessing whether this has impacted the particulate properties of the dispersion, e.g., by comparing particle morphology of the dispersion by microscopy before and after temperature sensitivity testing or other stability testing method.

In some embodiments, the shelf stability of the disclosed CPAM dispersions may be determined by centrifugation at 6000 rpm for 15 min in a Heraeus Megafuge 2.0 which is equivalent to a shelf life of 65 days under normal gravity of Earth. Stable aqueous dispersions are homogenous and flow smoothly after centrifugation, whereas unstable dispersions will have phase separation and may form gels.

As previously noted in some embodiments, the CPAM dispersions of the present disclosure may be an aqueous dispersion which is shelf stable at room temperature for at least 10 days, at least 15 days, at least 20 days, at least 25 days, at least 30 days, at least 35 days, at least 40 days, at least 45 days, at least 50 days, at least 55 days, at least 60 days, or at least 65 days, or for at least 3, 4, 5, 6, 7, 8, 9, or 10 months, or even up to a year or more after preparation.

III. Methods for Preparing Aqueous Shelf-Stable CPAM Dispersions

Exemplary Polymerization Method

The present disclosure also generally relates a method for preparing improved aqueous CPAM dispersions as described herein, i.e., said aqueous CPAM dispersion comprising a) at least one cationic polyacrylamide (CPAM) comprising at least one acrylamide-based monomer and at least one cationic monomer, b) at least one polymeric stabilizer, c) ammonium sulfate ($(NH_4)_2SO_4$), d) sodium sulfate ($Na_2SO_4$) in an amount ranging from 1.0 wt. % to about 2.0 wt. %, preferably less than 2.0 wt. %, based on the total weight of the dispersion, and e) water;

wherein the aqueous dispersion is shelf stable at room temperature; and wherein optionally the pH of the aqueous dispersion is less than 5 and further optionally wherein shelf stability at room temperature is optionally assessed according to the exemplary afore-described temperature stability and/or centrifugation stability testing methods disclosed herein wherein said method comprises:

(A) polymerizing at least one acrylamide-based monomer and at least one cationic monomer in a polymerization reaction comprising water, said acrylamide-based monomer, said cationic monomer, at least one polymeric stabilizer, $(NH_4)_2SO_4$ ("ammonium sulfate"), $Na_2SO_4$ ("sodium sulfate"), and at least one polymerization initiator to form said aqueous CPAM dispersion comprising at least one CPAM polymer, water, at least one CPAM polymer, at least one polymeric stabilizer, $(NH_4)_2SO_4$ ("ammonium sulfate"), and $Na_2SO_4$ ("sodium sulfate"), and wherein said polymerization synthesis methods optionally include measuring pH of the polymerization reaction and adjusting the pH to less than 5.0 by adding at least one acid if the measured pH value is 5.0 or more, thereby obtaining an aqueous CPAM dispersion comprising:

a) at least one cationic polyacrylamide (CPAM) comprising at least one acrylamide-based monomer and at least one cationic monomer, b) at least one polymeric stabilizer, c) ammonium sulfate ($(NH_4)_2SO_4$), d) sodium sulfate ($Na_2SO_4$) in an amount ranging from 1.0 wt. % to about 2.0 wt. %, preferably less than 2.0 wt. %, based on the total weight of the dispersion, and e) water;

wherein the resultant aqueous dispersion is shelf stable at room temperature; and wherein optionally the pH of the aqueous dispersion is less than 5, and further optionally wherein shelf stability of the aqueous dispersion at room temperature is optionally assessed according to the exemplary afore-described temperature stability and/or centrifugation stability testing methods disclosed infra.

Polymerization is typically performed in an air-tight, temperature-controlled reactor, such as a reactor having 1000 mL capacity. The reactor may be purged with nitrogen to effectively remove oxygen which acts as a polymerization inhibitor. Typically, nitrogen is purged via a porous glass sinter in order to create small bubbles. During polymerization, nitrogen flow may be reduced and limited to only the gas space within the reactor to minimize water evaporation. Condensation of water should be avoided, since water droplets create gel when in contact with the dispersion, thus damaging and altering the polymerization process. Effective agitation is crucial for a successful polymerization and sample preparation, however too fast agitation speed may also be detrimental. Typically, 200-300 rpm agitation may be suitable.

In some embodiments, the polymerizing may further comprise agitation of the polymerization reaction at about 200-300 rpm.

Polymerization is generally effected using a water soluble polymerization initiator wherein the particular selection depends upon the temperature range at which polymerization is effected. Suitable polymerization initiators have been previously mentioned herein as well as the temperature range at which these initiators are generally used.

In some embodiments, the initiator may be 2,2'-azobis[2-(2-imidazolin-2-yl)propane] dihydrochloride or may comprise V-50 (2,2'-Azobis(2-methylpropionamidine)dihydrochloride) or may comprise any of the afore-mentioned polymerization initiators which include water-soluble and water-insoluble polymerization initiators and mixtures thereof, e.g., wherein the selection may be influenced by the polymerization temperature or temperatures and or other conditions of the polymerization reaction.

In some exemplary embodiments V-50 (2,2'-Azobis(2-methylpropionamidine)dihydrochloride), may be used when polymerization is effected at 48-52° C.

While any water-soluble initiator should work, when the polymerization is effected at low temperatures, e.g., 38-45° C. (VA-044 (2,2'-azobis[2-(2-imidazolin-2-yl)propane] dihydrochloride) may be favored over some other initiators to obtain a high MW polymer.

Another important factor that may influence the selected polymerization temperature, and also the polymerization initiator or initiators which will provide for optimal results is salt solubility. In particular while the polymerization reaction may be effected at lower temperatures, e.g. in the range −5-30° C. by using redox initiator systems; at such low temperatures polymer precipitation in the dispersion becomes more challenging. This occurs because dissolved sulfate concentration (the driving force for precipitation) decreases. Therefore, in exemplary embodiments, the selected polymerization initiator may also depend on dissolved salt concentration.

In some embodiments, the initiator may be VA-044 (2,2'-azobis[2-(2-imidazolin-2-yl)propane] dihydrochloride) e.g., when polymerization is effected at 38-45° C.

In other embodiments the initiator may comprise any of the water-soluble initiators previously identified or any combination thereof wherein again wherein the specific selection may be influenced by the temperature range of the polymerization method and/or salt solubility and/or dissolved sulfates.

In some embodiments, the initiator may be added in one or more doses throughout the polymerization reaction, such as two doses, three doses, four doses, or five doses.

In some embodiments, the total amount of the at least one initiator added during the polymerization reaction may generally range from about 100 to about 600 wppm (weight part per million) per monomer, about 300 to about 500 wppm per monomer, from about 350 to about 400 wppm per monomer or from about 200 to about 250 wppm or from about 100 to about 150 wppm. The selected or optimal amount will vary dependent upon the particular initiator or initiators used, temperature conditions, salt conditions, among other factors. In some embodiments the polymerization reaction will result in >95% of total monomers being consumed by dosing just 100-150 wppm of azo-initiator in several small shots. In some embodiments the polymerization conditions which provide for the consumption of monomer residues to very low levels, e.g., >95% of total monomers being consumed may require a large azo-initiator shot of 200-400 wppm and a 2-10° C. increase of polymerization temperature.

In some embodiments the initiator dosage and the batch maturation time (time to reach desired consumption of monomer residues to very low levels) may depend on the selected initiator. Moreover, in some embodiments, the selection of a too potent initiator may be disfavored as the resultant short maturation time may destroy or impair dispersion stability (which optionally may be assessed using the afore-described stability testing methods).

In some embodiments, the polymerizing may be performed at a controlled temperature ranging from about 38° C. to about 55° C. In some embodiments, the temperature may be raised by 2-10° C., e.g., or raised about 5° C. after the last dose of initiator is added, such as after the last and/or first dose of initiator is added.

In some embodiments, the pH of the polymerization reaction may be adjusted to about 4.0.

In some embodiments, the pH of the polymerization reaction may be adjusted to about 4.0 by addition of at least one acid, such as citric acid, adipic acid and/or acetic acid.

In some embodiments, progress of the polymerization reaction may be monitored, for example, by observing the mixing torque, dispersion color and/or temperature difference between the reactor jacket and the reaction mixture.

In some embodiments, said acrylamide-based monomer may be any acrylamide-based monomer known in the art. For example, in some embodiments, said acrylamide-based monomer may be selected from acrylamide, methacrylamide, ethylacrylamide, crotonamide, N-methyl acrylamide, N-butyl acrylamide, N-ethyl methacrylamide, and any combination thereof.

In some embodiments, the prepared CPAM polymer may be a low cationic polymer comprising from about 1 to about 15 mol % of at least one cationic monomer, typically from about 5 to about 10 mol %.

xxvii. In some embodiments, the prepared CPAM polymer may have an average molecular weight ranging from about 3 MDa to about 20 MDa and/or said at least one CPAM polymer has a standard viscosity (SV), ranging from 2-7 cP, more typically in the range 3.5-4.5 cP or 4.0 cP when measured as 0.1% polymer in 1 M NaCl, measured with Brookfield viscometer using UL-adapter at 60 rpm and at 25° C.

In some embodiments, said cationic monomer may be any cationic monomer known in the art. For example, in some embodiments, said cationic monomer may be selected from the group consisting of 2-(dimethylamino)ethyl acrylate methyl chloride ("Q9"), acryloyloxy ethyl trimethyl ammonium chloride ("AETAC"), methacryloyloxyethyltrimethyl ammonium chloride, methacrylamidopropyl trimethyl ammonium chloride ("MAPTAC"), acrylamidopropyltrimethyl ammonium chloride, methacryloyloxy ethyldimethyl ammonium sulfate, dimethylaminoethyl acrylate, dimethylaminopropyl methacrylamide, Q6, Q6o4, diallyldimethyl ammonium chloride ("DADMAC"); dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MSQ"), dimethyaminoethyl acrylate benzyl chloride quaternary salt ("DMAEA.BCQ"), dimethylamino-ethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethyl ammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkyl ammonium halides such as diallyldiethyl ammonium chloride and diallyldimethyl ammonium chloride, and any combination thereof.

In some embodiments, said cationic monomer may be 2-(dimethylamino)ethyl acrylate methyl chloride ("Q9").

In some embodiments, said prepared CPAM polymer may be amphoteric and may further comprise at least one anionic monomer with the proviso that the CPAM polymer has an overall positive charge. Said anionic monomer may be any anionic monomer known in the art. For example, said anionic monomer may be selected from the group consisting of acrylic acid, methacrylic acid, maleic acid, itaconic acid, vinyl sulfonic acid, 2-acrylamido-2-methylpropane sulfonic acid (AMPS), acrylamido methane sulfonic acid, acrylamido ethane sulfonic acid, 2-hydroxy-3-acrylamide propane sulfonic acid, styrene sulfonic acid, vinyl phosphonic acid, and combinations thereof, as well as their corresponding water soluble or dispersible alkali metal, alkaline earth metal, and ammonium salts, and any combination thereof.

In some embodiments, said prepared CPAM dispersion may have a dry solids content ranging from 40-60%, more typically 45-54 wt % and most typically 49-53%. The dry solids content is affected by the CPAM polymer content, which in exemplary embodiments may range from about 10-30%, and more typically will range from 15-20%. In some embodiments the CPAM content may be as high as 25-30%.

In some embodiments, said polymeric stabilizer may be a low molecular weight cationic polymeric stabilizer having an average molecular weight ranging from about 100 to about 2000 kg/mol or 200 to 1000 kg/mol or 200-600 kg/mol.

In some embodiments, said polymeric stabilizer may be selected from the group consisting of poly(2-(dimethylamino)ethyl acrylate methyl chloride) ("pQ9"), poly(2-(dimethylamino)ethyl methacrylate methyl chloride) ("pQ6" or "pMADAM-Cl"), poly(diallyldimethyl ammonium chloride) ("pDADMAC"), and any combination thereof.

In some embodiments, said polymeric stabilizer may be present at a concentration ranging from about 0.5 to about 10 wt %, typically from about 0.5 to about 5 wt %, and more typically from about 0.5 to about 2.5 wt %.

In some embodiments, said $(NH_4)_2SO_4$ may be present at a concentration ranging from about 10.0 to about 40.0 wt % or 15-35% and typically ranges from about 15.0 to about 30 wt %. Less than 20 wt % ammonium sulfate levels are suitable, e.g., if the polymerization reaction system contains readily precipitating hydrophobic monomers.

In some embodiments, said polymerization reaction may have a pH of about 4.0.

In some embodiments, said polymerization reaction may further comprise an acid, e.g., citric acid.

In some embodiments, said polymerization reaction may further comprise an additive selected from sodium-1-naphthalene sulfonate ("SNS"), sodium xylene sulfonate ("SXS"), sodium toluene sulfonate ("STS"), and any combination thereof.

In some embodiments, said polymerization reaction may further comprise a co-stabilizer, e.g., glycerol.

In some embodiments, said polymerization reaction may further comprise a chelating agent, e.g., EDTA-2Na.

In some embodiments, said polymerization reaction may not comprise fumed silica.

The prepared CPAM dispersion may be an aqueous dispersion which is shelf stable at room temperature. In some embodiments, the shelf stability of the prepared CPAM dispersions may be determined by centrifugation at 6000 rpm for 15 min in a Heraeus Megafuge 2.0 which is equivalent to a shelf life of 65 days under normal gravity of Earth. Stable aqueous dispersions are homogenous and flow smoothly after centrifugation, whereas unstable dispersions will have phase separation and may form gels. In some embodiments, the prepared CPAM dispersion of the present disclosure may be an aqueous dispersion which is shelf stable at room temperature for at least 1 day, at least 2 days, at least 3 days, at least 4 days, at least 5 days, at least 10 days, at least 15 days, at least 20 days, at least 25 days, at least 30 days, at least 35 days, at least 40 days, at least 45 days, at least 50 days, at least 55 days, at least 60 days, or at least 65 days.

Combination Method

Moreover, the present disclosure generally relates a method for preparing an improved aqueous CPAM dispersion as described herein, said method comprising: combining water, at least one CPAM polymer, at least one polymeric stabilizer, $(NH_4)_2SO_4$ ("ammonium sulfate"), and $Na_2SO_4$ ("sodium sulfate"), wherein said CPAM polymer comprises at least one acrylamide-based monomer and at least one cationic monomer, wherein $Na_2SO_4$ is present at a concentration which is less than about 3.0 wt %, typically at least 1.0 wt % and further typically less than 2.0 wt %, wherein the method further comprises measuring pH of the CPAM dispersion and adjusting the pH to less than 5.0 by adding at least one acid if the measured pH value is 5.0 or more, and wherein the prepared aqueous CPAM dispersion is an aqueous dispersion which is shelf stable at room temperature. In some embodiments, the method may further comprise agitation of the prepared CPAM dispersion such as by shaking or vortexing.

In some embodiments, said acrylamide-based monomer may be any acrylamide-based monomer known in the art. For example, in some embodiments, said acrylamide-based monomer may be selected from acrylamide, methacrylamide, ethylacrylamide, crotonamide, N-methyl acrylamide, N-butyl acrylamide, N-ethyl methacrylamide, and any combination thereof.

In some embodiments, the CPAM polymer may be a low cationic polymer comprising from about 1 to about 15-20 mol % of at least one cationic monomer, typically from about 5 to about 10 or 15 mol %.

xxviii. In some embodiments, the CPAM polymer may have an average molecular weight ranging from about 3 MDa to about 20 MDa and/or has a standard viscosity (SV), ranging from 2-7 cP, more typically in the range 3.5-4.5 cP or 4.0 cP when measured as 0.1% polymer in 1 M NaCl, measured with Brookfield viscometer using UL-adapter at 60 rpm and at 25° C.

In some embodiments, said cationic monomer may be any cationic monomer known in the art. For example, in some embodiments, said cationic monomer may be selected from the group consisting of 2-(dimethylamino)ethyl acrylate methyl chloride ("Q9"), acryloyloxy ethyl trimethyl ammonium chloride ("AETAC"), methacryloyloxyethyltrimethyl ammonium chloride, methacrylamidopropyl trimethyl ammonium chloride ("MAPTAC"), acrylamidopropyltrimethyl ammonium chloride, methacryloyloxy ethyldimethyl ammonium sulfate, dimethylaminoethyl acrylate, dimethylaminopropyl methacrylamide, Q6, Q6o4, diallyldimethyl ammonium chloride ("DADMAC"); dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MSQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacry-lamides or methacrylamides and their quaternary or acid salts such as acrylamidopropyltrimethylammonium chlo-ride, dimethylaminopropyl acrylamide methyl sulfate qua-ternary salt, dimethylaminopropyl acrylamide sulfuric acid salt, dimethylaminopropyl acrylamide hydrochloric acid salt, methacrylamidopropyltrimethyl ammonium chloride, dimethylaminopropyl methacrylamide methyl sulfate qua-ternary salt, dimethylaminopropyl methacrylamide sulfuric acid salt, dimethylaminopropyl methacrylamide hydrochlo-ric acid salt, diethylaminoethylacrylate, diethylaminoethyl-methacrylate and diallyldialkyl ammonium halides such as diallyldiethyl ammonium chloride and diallyldimethyl ammonium chloride, and any combination thereof.

In some embodiments, said cationic monomer may be 2-(dimethylamino)ethyl acrylate methyl chloride ("Q9").

In some embodiments, said CPAM polymer may be amphoteric and may further comprise at least one anionic monomer with the proviso that the CPAM polymer has an overall positive charge. Said anionic monomer may be any anionic monomer known in the art. For example, said anionic monomer may be selected from the group consisting of acrylic acid, methacrylic acid, maleic acid, itaconic acid, vinyl sulfonic acid, 2-acrylamido-2-methylpropane sulfonic acid (AMPS), acrylamido methane sulfonic acid, acry-lamido ethane sulfonic acid, 2-hydroxy-3-acrylamide pro-pane sulfonic acid, styrene sulfonic acid, vinyl phosphonic acid, and combinations thereof, as well as their correspond-ing water soluble or dispersible alkali metal, alkaline earth metal, and ammonium salts, and any combination thereof.

In some embodiments, said prepared CPAM dispersion may have a solids content ranging from 40-60%, more typically 45-54 wt % and most typically 49-53%. The dry solids content is affected by the CPAM polymer content, which in exemplary embodiments may range from about 10-30%, and more typically will range from 15-20%. In some embodiments the CPAM content may be as high as 25-30%.

In some embodiments, said polymeric stabilizer may be a low molecular weight cationic polymeric stabilizer having an average molecular weight ranging from about 100 to about 200 kg/mol or 200 to 1000 kg/mol or 200-600 kg/mol.

In some embodiments, said polymeric stabilizer may be selected from the group consisting of poly(2-(dimethyl-amino)ethyl acrylate methyl chloride) ("pQ9"), poly(2-(di-methylamino)ethyl methacrylate methyl chloride) ("pQ6" or "pMADAM-Cl"), poly(diallyldimethyl ammonium chlo-ride) ("pDADMAC"), and any combination thereof.

In some embodiments, said polymeric stabilizer may be present at a concentration ranging from about 0.5 to about 10 wt %, typically from about 0.5 to about 5 wt %, and more typically from about 0.5 to about 2.5 wt %.

In some embodiments, said $(NH_4)_2SO_4$ may be present at a concentration ranging from about 10.0 to about 40.0 wt % or 15-35% and typically ranges from about 15.0 to about 30 wt %. As mentioned previously less than 20 wt % ammo-nium sulfate levels are suitable, e.g., if the polymerization reaction system contains readily precipitating hydrophobic monomers.

In some embodiments, the prepared CPAM dispersion may have a pH of about 4.0.

In some embodiments, the prepared CPAM dispersion may further comprise an acid, e.g., citric acid, adipic acid or acetic acid.

In some embodiments, the prepared CPAM dispersion may further comprise an additive selected from sodium-1- naphthalene sulfonate ("SNS"), sodium xylene sulfonate ("SXS"), sodium toluene sulfonate ("STS"), and any com-bination thereof.

In some embodiments, the prepared CPAM dispersion may further comprise a co-stabilizer, e.g., glycerol.

In some embodiments, the prepared CPAM dispersion may further comprise a chelating agent, e.g., EDTA-2Na.

In some embodiments, the prepared CPAM dispersion may not comprise fumed silica.

The prepared CPAM dispersion may be an aqueous dis-persion which is shelf stable at room temperature. In some embodiments, the shelf stability of the prepared CPAM dispersions may be determined by centrifugation at 6000 rpm for 15 min in a Heraeus Megafuge 2.0 which is equivalent to a shelf life of 65 days under normal gravity of Earth. Stable aqueous dispersions are homogenous and flow smoothly after centrifugation, whereas unstable dispersions will have phase separation and may form gels. In some embodiments, the prepared CPAM dispersion of the present disclosure may be an aqueous dispersion which is shelf stable at room temperature for at least 1 day, at least 2 days, at least 3 days, at least 4 days, at least 5 days, at least 10 days, at least 15 days, at least 20 days, at least 25 days, at least 30 days, at least 35 days, at least 40 days, at least 45 days, at least 50 days, at least 55 days, at least 60 days, or at least 65 days.

IV. Methods of Using Aqueous Shelf-Stable CPAM Dispersions

Based on the foregoing, the present disclosure further generally relates to use of the aqueous shelf-stable CPAM dispersions as afore-described as a retention aid in paper-making applications and/or processes to maintain adequate efficiency, drainage, and cleanliness of a paper machine, to achieve adequate Z-directional uniformity, to retain addi-tives, including fillers, and to improve one or more strength properties of the produced paper. In some embodiments, the CPAM dispersion may increase retention of starch to a formed paper web and/or board web. In some embodiment, the CPAM dispersion may increase at least one strength property of the formed paper web and/or board web. In some embodiments, the strength property may be selected from burst strength, short span compression (SCT), tensile strength, and any combination thereof.

The present disclosure further generally relates to a method of papermaking wherein said method may comprise adding one or more CPAM dispersions as afore-described, which, based on their dispersion are useful in papermaking processes, and which moreover possess improved shelf-life and beneficial storage properties, during the papermaking method in an amount effective to increase the dry strength of paper products produced by said method. In some embodi-ments, the one or more CPAM dispersions is added to a dispersion comprising fiber and/or pulp used in the method prior to the paper product being formed. In some embodi-ments, the one or more CPAM dispersions is added to one or more surfaces of the paper product after the paper product is formed.

Moreover, the present disclosure generally encompass a method of manufacturing one or more paper products, e.g., one or more adsorbent paper products, wherein said method comprises: a. providing a dispersion comprising any of softwood fiber, hardwood fiber, recycle fiber, refined fiber, or a mixture of any of the foregoing in an amount sufficient to form an overall furnish of from approximately 1 to 100% hardwood fiber, softwood fiber, recycle fiber, refined fiber or a mixture of any of the foregoing; (b) adding a predetermined quantity of one or more CPAM dispersions as discussed herein; and (c) forming a paper product by drying via one or more drying means to a desired moisture content level.

Additionally, the present disclosure generally relates to a method for strengthening paper, comprising (i) contacting pulp fibers with a strengthening resin comprising at least one CPAM dispersion, e.g., at least one of the improved CPAM dispersions disclosed herein, which CPAM dispersions possess specific attributes which render them well suited for use in papermaking processes, and (ii) at least partially curing the strengthening resin comprising at least one CPAM dispersion in the mixture of pulp fibers and CPAM dispersion to produce a paper product of enhanced strength. In some embodiments, at least one strength property of the produced paper product is improved. In some embodiments, the strength property may be selected from burst strength, short span compression (SCT), tensile strength, and any combination thereof.

When using a CPAM dispersion as disclosed herein during a papermaking method, the CPAM dispersion can be added at any time before, during and/or after paper formation. In some instances, the CPAM dispersion may be added at the wet end of a paper-making facility to the cellulose fiber suspensions, generally at a point when wet strength resins are conventionally added. In some embodiments, the CPAM dispersion can be added to a previously prepared paper, e.g., to one or more surfaces of a previously prepared paper, by padding, spraying, immersing, and/or printing and the like. Moreover, in some embodiments, the CPAM dispersion may be added to paper pulp over a wide range of pH values, such as from about 4 to about 9.

In some instances, the amount of CPAM dispersion added during a papermaking method may range from about 0.02% by dry weight to about 10% by dry weight of the cellulose fibers, e.g., in the range of about 0.05 wt % to 5 wt % of the dry paper weight.

V. Paper Products Comprising Aqueous Shelf-Stable CPAM Dispersions

Moreover, the present disclosure further relates to paper products comprising one or more improved CPAM dispersions as disclosed herein. In some embodiments, the paper product may comprise at least one paper layer or web containing the CPAM dispersion, for example, paper sheeting, paperboard, tissue paper, and wall board. In some embodiments, the paper product comprises the CPAM dispersion on at least one surface of the paper product. The CPAM dispersion is not limited to use in any particular type of paper or papermaking method and should find application in Kraft paper, sulfite paper, semi-chemical paper, and the like, including paper produced using bleached pulp, unbleached pulp, or combinations thereof.

In some embodiments, the paper product may comprise an improvement of at least one paper strength property, e.g. as determined by STFI testing and/or burst strength testing, compared to a paper product that does not comprise a CPAM dispersion. In some embodiments, the strength property may be selected from burst strength, short span compression (SCT), tensile strength, and any combination thereof.

General Description of Methods and Materials Used to Make Stable Aqueous CPAM Dispersions According to the Invention Synthesis of exemplary CPAM dispersions and properties thereof is disclosed in the examples which follow. In general low cationic (i.e., 9 mol %) polyacrylamide (CPAM) dispersions were prepared by polymerizing acrylamide monomer and cationic Q9 monomer in salt brine in the presence of low molecular weight polymeric stabilizer. CPAM polymer precipitates as few micrometer particles in the presence of $(NH_4)_2SO_4$ and $Na_2SO_4$ salts. The stabilizer was poly (DADMAC) (CAS 26062-79-3), poly(Q6) (pQ6) (CAS: 26161-33-1), poly(Q9) (CAS: 54076-97-0), or similar low molecular weight cationic polymers. Polymerization was done at 38-50 degrees C. using thermal 50-300 ppm VA-044 initiator.

Specifically, the preparation of the dispersion samples was done in jacketed 1 L glass reactor equipped with a Heidolph mechanical mixer, a magnetic coupling (90 Ncm) and a helical agitator coated with Teflon. Reactor temperature was controlled by circulating silicon oil in reactor jacket via Lauda thermostatic bath using a glass reactor layout.

In these preparations, the initial batch is purged with $N_2$ to effectively remove oxygen which acts as polymerization inhibitor. $N_2$ is purged via porous glass sinter to create small bubbles. During polymerization, $N_2$ flow is reduced and limited only to the gas space to minimize water evaporation. Condensation of water should be avoided, because water droplets create gel when in contact with the dispersion, which may damage and alter the polymerization process. Effective agitation is required for successful polymerization and sample preparation, however too much agitation may also be detrimental. It was found that 200-300 rpm was suitable in the experiments here presented. Polymerization is monitored by observing the mixing torque, dispersion color, and temperature difference between the jacket and the reaction mixture.

The general procedure for preparing the dispersion samples is as follows:

1. Addition of water, glycerol, polymeric stabilizer, AMD and Q9.
2. Addition of $Na_2SO_4$, $(NH_4)_2SO_4$, SNS or STS or SXS, EDTA-2Na, and citric acid, the mixture is stirred for at least 30 minutes.
3. Stirring continues and reactor temperature is set to the desired reaction temperature (38-50° C.).
4. pH is measured, must be close to 4.0, some addition of citric acid may be necessary.
5. The mixing is stopped and the sintered sparger is inserted below liquid level and $N_2$ purging starts (1 NL/min) and lasts for 60 min.
6. The initiator mixture is prepared by making a brine with oxygen free deionized water (purged with $N_2$, at least 30 min) and the salts ($Na_2SO_4$, $(NH_4)_2SO_4$ in the same proportion as in the dispersion recipe.
7. The $N_2$ feed is reduced to 0.1 NL/min and the feed tube is positioned just above the liquid surface to create a nitrogen blanket.
8. The first initiator dosage is added (20 wppm per monomer).
9. The polymerization is monitored, the signs of reaction are change in color (transparent to white), clear exotherm and increase in mixing torque.
10. Second initiator dosage is added after 3 hour from first initiator addition (5 wppm per monomer).
11. Third initiator dosage is added after 5 hour from first initiator addition (10 wppm per monomer).
12. Fourth initiator dosage is added after 8 hours from first initiator addition (100 wppm per monomer).
13. Fifth initiator addition is added after 20 hours from first initiator addition (250 wppm per monomer).

14. The reactor temperature is increased by 5 degrees Celsius after the 5th addition and is maintained for 2 hours.

15. Reactor is cooled down within 60 min to room temperature (20° C.) and discharged.

Exemplary dispersions according to the invention are disclosed below:

VI. Examples

The following examples which provide detailed methods for producing aqueous dispersions according to the invention are provided for illustrative purposes only and are non-limiting.

Example 1 (B-141)

Experiments were done in a one liter reactor equipped with a helical agitator, temperature control and a cooling jacket. 239.12 g of deionized water, 24.10 g of glycerol, 60.56 g of stabilizer p(Q6) (15.8 wt %), 214.60 g of acrylamide (50.1 wt %) and 36.37 g of Q9 (80 wt %) were added into reactor. Subsequently, the solids were added according to: 222.02 g of (NH4)2SO4, 0.078 g of EDTA-2Na, 0.962 g of SNS, and 2.01 g of citric acid monohydrate. The mixture was stirred for 30 minutes. With the stirring on, the mixture was heated to 40° C. Mixing was stopped and a glass sinter was inserted below liquid level to sparge the solution for 60 min with 1 NL/min. A solution of VA-044 initiator was prepared using the same (NH4)2SO4 concentration of the whole mixture, the solution was sparged with N2 Agitator stirring speed was adjusted to 300 rpm. The nitrogen feed was reduced to 0.1 NL/min (N2 flow rate as normal liters (at 0° C. and 1.013 bara) per minute), and the feed tube was positioned above the liquid to create a N2 blanket. Subsequently, 0.555 g of the initiator solution (0.5 wt %) was added to the reactor. Polymerization began soon after initiator addition, the signs of reaction became evident after about 15 min. These signs were change in color (transparent to white), clear exotherm and increase in mixing torque. The second initiation addition, 0.072 g (1.0 wt %), was done after 5 h46' from initiation. The third initiation addition, 0.1489 g (1.0 wt %), was done after 6 h37' from initiation. The fourth initiation addition, 1.0118 g (1.0 wt %), was done after 7 h40' from initiation. The fifth initiation addition, 0.6847 g (1.0 wt %), was done after 8 h7'. The dispersion was left to maturate and the $6^{th}$ initiator addition, 1.3632 g (2.5 wt %), was done after 22 h28' from initiation. The $7^{th}$ initiator addition, 1.17 g (2.5 wt %), was done after 24 h from initiation. The dispersion was kept maturating for 5 h and it was cooled down within 60 min after to room temperature (22° C.) and the reactor was discharged. The dispersion was unstable, did not pass the centrifugation test.

Example 2 (B-115)

Same reactor setup was used as in Example 1, firstly 207.73 g of deionized water, 24.00 g of glycerol, 51.99 g of stabilizer p(Q6) (18.48 wt %), 250.62 g of acrylamide (50.4 wt %) and 42.53 g of Q9 (80 wt %), 208.05 g of (NH4)2SO4, 12.01 g of Na2(SO4), 0.099 g of EDTA-2Na, 1.1624 g of NaXS, and 2.00 g of citric acid monohydrate were added into reactor. The mixture was stirred for at least 30 minutes. With the stirring on, the mixture was heated to 40° C. Mixing was stopped and a sinter was inserted below liquid level to sparge the solution for 60 min with 1 NL/min. A solution of VA-044 initiator was prepared using the same (NH4)2SO4 and Na2(SO4) concentration of the whole mixture, the solution was sparged with N2. Agitator stirring speed was adjusted to 300 rpm. The nitrogen feed was reduced to 0.1 NL/min, and the feed tube was positioned above the liquid to create a N2 blanket. Subsequently, 0.489 g (0.5 wt %) of the initiator solution was added to the reactor. Polymerization began soon after initiator addition, the signs of reaction became evident after about 15 min. These signs were change in color (transparent to white), clear exotherm and increase in mixing torque. The second initiation addition, 0.032 g (2.5 wt %), was done after 4 h 55' from initiation. The third initiation addition, 0.032 g (2.5 wt %), was done after 7 h 12' from initiation. The fourth initiation addition, 0.067 g (2.5 wt %), was done after 7 h 58' from initiation. The fifth initiation addition, 0.240 g (2.5 wt %), was done after 8 h 50' from initiation. The $6^{th}$ initiator addition, 0.492 g (2.5 wt %), was done after 9 h20' from initiation. The $7^{th}$ initiator addition, 0.8277 g (2.5 wt %), was done after 22 h 55' from initiation. The dispersion was kept maturating for 2 h at 43° C., subsequently it was cooled down within 60 min after to room temperature (22° C.) and the reactor was discharged. The dispersion was stable, it did pass the centrifugation test.

Example 3 (B-37 Fed-Batch)

Same reactor setup was used as in Example 1. 162.0 g of deionized water, 27.97 g of glycerol, 47.78 g of stabilizer p(DADMAC) (20.0 wt %), 220.14 g of acrylamide (38 wt %) and 28.21 g of Q9 (80 wt %). 208.01 g of (NH4)$_2$SO4, 11.98 g of Na$_2$(SO4), 0.08 g of EDTA-2Na, and 1.50 g of citric acid (anhydrous). The mixture was stirred for at least 30 minutes. With the stirring on, the mixture was heated to 39° C. Mixing was stopped and a sinter was inserted below liquid level to sparge the solution for 60 min with 1 NL/min. A 1 wt % solution of VA-044 initiator was prepared using the same (NH$_4$)$_2$SO4 and Na$_2$(SO$_4$) concentration of the whole mixture, the solution was sparged with N2Agitator stirring speed was adjusted to 300 rpm. The nitrogen feed was reduced to 0.1 NL/min, and the feed tube was positioned above the liquid to create a N2 blanket. The reaction was initiated by adding 0.367 g of the initiator solution (1 wt %) was added to the reactor. Polymerization began soon after initiator addition, the signs of reaction became evident after about 15 min. These signs were change in color (transparent to white), clear exotherm and increase in mixing torque. A monomer mixture of 92 g in total was added via dropping funnel after the reaction started. The monomer mixture consisted of 62.8 g of AMD, 8.04 g of Q9 and 21.16 g of deionized water. Monomer mixture was purged with nitrogen to make it free of oxygen. The monomer feed started at 1.5 h after first initiator addition and ended at 6.7 h from initiation. The 96 g of monomer mixture were added according to the following sequence: 7.5 g in 10 min plus 15 min pause (four times), 10 g in 10 min plus 15 min pause (six times) and 2 g in 2 min. The second initiator additions were done after 7 h11' from initiation. The second initiator consisted of 3.518 g of 1 wt % solution. After the second initiator dosage the temperature was raised steadily for 10 hours from 39 to 45° C. The third initiator mixture, 2.049 g (1 wt %), was added 22 h after initiation. The dispersion was left to maturate for 2 more hours before it was cooled down within 60 min to room temperature (22° C.) and the reactor was discharged.

Table 1 below presents more example dispersion "recipes". In all instances the total batch sizes were 800 g, with a 9% molar cationicity, the concentration of Q9 monomer was 80 wt % in all experiments, the initiator was dosed in 1 wt % brine solution made with the same Na$_2$(SO4) and (NH4)$_2$SO4 concentrations as the dispersion.

TABLE 1

Content ("Recipe") of Exemplary Aqueous Dispersions

| Experiment | Stabilizer, concentration (wt) | Stabilizer (g) | CPAM (wt %) | AMD concentration (wt) | $(NH_4)_2SO_4$ (g) | $Na_2SO_4$ (g) | Glycerol (g) | Citric acid (g) | EDTA-2Na (g) | Initiator (g) | Additive, (g) |
|---|---|---|---|---|---|---|---|---|---|---|---|
| B96 (batch) | pDADMAC, 20,00 | 47.59 | 17 | 38.0% | 216.04 | 16.03 | 32.01 | 1.01 | 0.19 | 0.041 | — |
| BA_10 (batch) | pDADMAC, 20% | 47.61 | 17 | 38.0% | 213.61 | 16.40 | 32.04 | 1.25 | 0.176 | 0.041 | — |
| B110 (batch) | pDADMAC, 20% | 51.10 | 17 | 38.0% | 218.08 | 14.04 | 32.04 | 1.01 | 0.19 | 0.04 | — |
| DB_122 (batch) | p(Q6), 16.20% | 59.53 | 17 | 50.4% | 208.01 | 12.01 | 24.00 | 2.01 | 0.082 | 0.033 | — |
| DB_139 (batch) | p(Q6), 15.80% | 61.28 | 20 | 50.1% | 208.09 | 12.01 | 24.23 | 2.02 | 0.09 | 0.051 | SNS, 1.126 |
| B177 (fed-batch) | p(Q6), 13.7 | 66.62 | 17-19 | 38.0% | 208.52 | 12.04 | 24.06 | 1.48 | 0.0627 | 0.064 | — |
| 8-111 (batch) | p(Q6), 14.00% | 63.36 | 17 | 50.4% | 210.81 | 12.00 | 24.28 | 2.02 | 0.075 | 0.024 | NaTS (Sodium Toluene Sulfonate or STS), 1.03 |
| B-112 (batch) | p(Q6), 14.0% | 63.38 | 17 | 50.4% | 210.83 | 12.00 | 24.08 | 2.01 | 0.070 | 0.024 | NaOCN (sodium cyanate), 0.800 |
| B-142 (batch) | p(Q6), 15.80% | 60.57 | 17 | 50.1% | 216.09 | 6.01 | 24.12 | 2.05 | 0.080 | 0.086 | NaNS (sodium 1-naphthalene sulfonate or SNS), 0.954 |
| B-143 (batch) | p(Q6), 15.60% | 67.13 | 20 | 50.1% | 212.01 | 8.03 | 24.20 | 2.01 | 0.091 | 0.096 | NaNS, 1.124 |

TABLE 2

Dispersion Stabilities

| Experiment | Stable? |
|---|---|
| B96 (batch) | NO |
| BA_10 (batch) | NO |
| B110 (batch) | YES |
| DB_122 (batch) | YES |
| DB_139 (batch) | YES |
| B177 (fed-batch) | YES |
| B-111 (batch) | YES |
| B-112 (batch) | YES |
| B-142 (batch) | NO |
| B-143 (batch) | YES |

The results in Table 2 show that the stability of dispersions according to the invention was unexpectedly dependent on the concentration of $Na_2SO_4$. It was further surprisingly found that there is a specific window for the samples to pass the centrifugation test, i.e. to be stable. For a sample to be stable, the $Na_2SO_4$ concentration must be $\geq 1.0$ wt. % but <2.0 wt. %, based on the total weight of the dispersion.

FIG. 1A shows an exemplary stable (i.e., homogenous) aqueous CPAM dispersion after centrifugation testing.

FIG. 1B shows an exemplary unstable (i.e., separated) aqueous CPAM dispersion after centrifugation testing.

Example 4: Stability Testing of Additional Aqueous CPAM Dispersions

Stability testing by the centrifugation method for aqueous CPAM dispersions prepared by analogous polymerization methods to those described supra was performed. Results are shown in Table 3.

TABLE 3

Stability Testing Results

| Polymerization# | Stabilizer type | Stabilizer concentration wt % | $(NH_4)_2SO_4$ wt % | $Na_2SO_4$ wt % | Product Stability |
|---|---|---|---|---|---|
| B15 | C-591 (pDADMAC) | 0.5% | 26.6% | 3.0% | No |
| B70 | C-591 (pDADMAC) | 0.5% | 26.5% | 3.0% | No |
| B73 | C-591 (pDADMAC) | 0.5% | 26.4% | 3.0% | No |
| B76 | Alcomer (pMADAM-Cl) | 0.5% | 26.4% | 3.0% | No |
| B82 | C-591 (pDADMAC) | 0.7% | 26.5% | 3.0% | No |
| B83 | Alcomer (pMADAM-Cl) | 1.0% | 28.0% | 1.5% | Yes |
| B84 | C-591 (pDADMAC) | 0.5% | 26.1% | 3.0% | No |
| B91 | Alcomer (pMADAM-Cl) | 1.4% | 28.5% | 1.0% | Yes |
| B92 | C-591 (pDADMAC) | 1.0% | 26.1% | 3.0% | No |

TABLE 3-continued

Stability Testing Results

| Polymerization# | Stabilizer type | Stabilizer concentration wt % | $(NH_4)_2SO_4$ wt % | $Na_2SO_4$ wt % | Product Stability |
|---|---|---|---|---|---|
| B93 | Alcomer (pMADAM-Cl) | 1.4% | 28.5% | 0.0% | Yes |
| B96 | C-591 (pDADMAC) | 1.4% | 26.1% | 3.0% | No |
| B97 | Stabpol-16 (pDADMAC) | 0.6% | 28.0% | 1.5% | No |
| B99 | Alcomer (pMADAM-Cl) | 1.2% | 27.5% | 1.5% | Yes |
| B101 | Alcomer (pMADAM-Cl) | 1.2% | 27.0% | 1.5% | Yes |
| B102 | C-591 (pDADMAC) | 1.0% | 26.5% | 2.5% | No |
| B104 | C-591 (pDADMAC) | 1.2% | 27.0% | 2.0% | No |
| B109 | C-591 (pDADMAC) | 1.3% | 27.0% | 2.0% | No |
| BA_04 | C-591 (pDADMAC) | 1.3% | 27.0% | 2.0% | No |
| B110 | C-591 (pDADMAC) | 1.3% | 27.3% | 1.8% | Yes |
| BA_05 | C-591 (pDADMAC) | 1.3% | 27.3% | 1.8% | Yes |
| BA_06 | C-591 (pDADMAC) | 1.2% | 26.8% | 2.3% | No |
| B114 | C-591 (pDADMAC) | 1.2% | 27.3% | 1.8% | Yes |
| BA_08 | C-591 (pDADMAC) | 1.2% | 27.0% | 2.0% | Yes |
| B116 | C-591 (pDADMAC) | 1.2% | 27.3% | 1.8% | No |
| B117 | C-591 (pDADMAC) | 1.1% | 26.9% | 2.2% | No |
| BA_09 | C-591 (pDADMAC) | 1.1% | 27.0% | 2.0% | No |
| DB_118 | C-591 (pDADMAC) | 1.1% | 27.3% | 1.8% | No |
| DB_119 | C-591 (pDADMAC) | 1.1% | 26.7% | 2.1% | No |
| BA_10 | C-591 (pDADMAC) | 1.2% | 26.7% | 2.1% | No |
| DB_120 | Stabpol_23 (pQ9) | 1.2% | 27.0% | 1.5% | Yes |
| DB_121 | Stabpol_25 (pQ9) | 1.2% | 27.0% | 1.5% | Yes |
| BA_11 | C-591 (pDADMAC) | 1.2% | 26.7% | 2.1% | No |
| DB_122 | Stabpol_23 (pQ9) | 1.2% | 27.0% | 1.8% | Yes |
| DB_123 | Stabpol_25 (pQ9) | 1.2% | 27.0% | 1.8% | Yes |
| DB_124 | Stabpol_23 (pQ9) | 1.1% | 26.9% | 1.8% | Yes |
| DB_125 | Stabpol_25 (pQ9) | 1.1% | 26.9% | 1.8% | Yes |
| BA_12 | C-591 (pDADMAC) | 1.3% | 26.4% | 2.2% | No |
| DB_126 | Stabpol_23 (pQ9) | 1.1% | 26.9% | 1.7% | Yes |
| DB_127 | Stabpol_25 (pQ9) | 1.1% | 26.9% | 1.8% | Yes |
| BA 13 | C-591 (pDADMAC) | 1.3% | 27.0% | 1.8% | Yes |
| BA_14 | C-591 (pDADMAC) | 1.3% | 26.9% | 1.8% | No |
| BA_15 | C-591 (pDADMAC) | 1.1% | 26.7% | 2.1% | No |
| DB-130 | C-591 (pDADMAC) | 1.1% | 26.7% | 2.1% | No |
| DB-132 | C-591 (pDADMAC) | 1.3% | 27.0% | 1.8% | Yes |
| DB-133 | C-591 (pDADMAC) | 1.1% | 26.7% | 2.1% | No |
| BA_16 | C-591 (pDADMAC) | 1.1% | 26.7% | 2.1% | No |
| BA_17 | C-591 (pDADMAC) | 1.3% | 27.0% | 1.5% | Yes |
| DB-134 | Stabpol_25 (pQ9) | 1.1% | 27.0% | 1.5% | Yes |
| DB-135 | Stabpol_25 (pQ9) | 1.1% | 27.0% | 1.5% | Yes |
| DB_136 | C-591 (pDADMAC) | 1.2% | 27.0% | 1.5% | Yes |
| DB_137 | C-591 (pDADMAC) | 1.2% | 26.5% | 1.8% | Yes |
| BA_18 | C-591 (pDADMAC) | 1.2% | 26.5% | 1.5% | Yes |
| DB_138 | C-591 (pDADMAC) | 1.2% | 26.3% | 1.8% | Yes |
| DB_139 | C-591 (pDADMAC) | 1.2% | 26.8% | 1.5% | Yes |
| DB-140 | Stabpol_27 (pQ9) | 1.2% | 26.5% | 1.5% | Yes |
| DB_141 | Alcomer (pMADAM-Cl) | 1.2% | 26.5% | 1.5% | Yes |
| BA_19 | C-591 (pDADMAC) | 1.2% | 26.5% | 1.5% | Yes |
| DB_142 | Stabpol_27 (pQ9) | 1.2% | 26.5% | 1.5% | Yes |
| DB_143 | Stabpol_25 | 1.2% | 26.5% | 1.5% | Yes |
| BA_20 | C-591 (pDADMAC) | 1.2% | 26.6% | 1.5% | Yes |
| BA_21 | Alcomer (pMADAM-Cl) | 1.2% | 26.5% | 1.5% | Yes |
| Pilot_02 | C-591 (pDADMAC) | 1.2% | 26.6% | 1.5% | Yes |
| BA_22 | C-591 (pDADMAC) | 1.2% | 26.0% | 1.5% | Yes |
| DB_144 | Stabpol_27 (pQ9) | 1.2% | 26.5% | 1.5% | Yes |
| DB_145 | Stabpol_27 (pQ9) | 1.2% | 26.5% | 1.5% | Yes |
| BA_23 | Stabpol_28 (pDADMAC) | 1.2% | 26.5% | 1.5% | Yes |
| DB_147 | Alcomer (pMADAM-Cl) | 1.2% | 26.5% | 1.5% | Yes |
| BA_24 | C-591 (pDADMAC) | 0.6% | 26.5% | 1.5% | Yes |
| DB_148 | C-591 (pDADMAC) | 1.2% | 26.5% | 1.5% | No |
| BA_25 | C-591 (pDADMAC) | 1.2% | 26.6% | 1.5% | Yes |
| BA_26 | C-591 (pDADMAC) | 1.2% | 26.6% | 1.5% | Yes |
| DB_153 | C-591 (pDADMAC) | 1.2% | 26.0% | 1.5% | Yes |
| BA_27 | C-591 (pDADMAC) | 1.2% | 26.6% | 1.5% | Yes |
| DB_155 | Alcomer (pMADAM-Cl) | 1.4% | 26.5% | 1.5% | Yes |
| BA_28 | C-591 (pDADMAC) | 1.2% | 26.5% | 1.5% | Yes |
| DB_156 | Alcomer (pMADAM-Cl) | 1.4% | 26.5% | 1.5% | Yes |
| BA_29 | C-591 (pDADMAC) | 1.2% | 26.3% | 1.5% | Yes |
| DB_158 | Alcomer (pMADAM-Cl) | 1.2% | 26.3% | 1.5% | Yes |
| DB_159 | Alcomer (pMADAM-Cl) | 1.2% | 26.5% | 1.5% | Yes |

As shown these dispersions were observed to be homogenous after polymerization. Stability was surprisingly found to depend strongly on $Na_2SO_4$ concentration: dispersions passed the stability test if their $Na_2SO_4$ concentration was less than 2.0 wt % and unstable if their $Na_2SO_4$ concentration was greater than 2.0 wt %, based on the total weigh to of the dispersion. There were very few exceptions to this rule among the 79 polymerizations, regardless of stabilizer type, $(NH_4)_2SO_4$ concentration, or other synthesis parameters.

Figure 2:
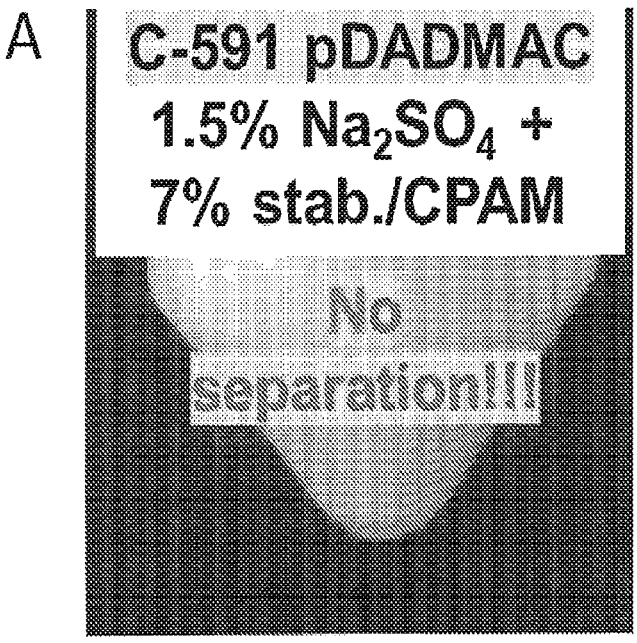
FIG. 2A is a photograph of a stable (i.e., homogenous) aqueous CPAM dispersion after centrifugation testing for 15 min at 6000 rpm.
FIG. 2B is a photograph of an unstable (i.e., separated) aqueous CPAM dispersion after centrifugation testing for 15 min at 6000 rpm.

FIG. 2A shows results for an exemplary stable (i.e., homogenous) aqueous CPAM dispersion after centrifugation testing for 15 min at 6000 rpm.

FIG. 2B shows results for an exemplary unstable (i.e., separated) aqueous CPAM dispersion after centrifugation testing for 15 min at 6000 rpm.

We claim:

1. An aqueous CPAM dispersion comprising:
   a) at least one cationic polyacrylamide (CPAM) comprising at least one acrylamide-based monomer and at least one cationic monomer;
   b) at least one polymeric stabilizer;
   c) ammonium sulfate $((NH_4)_2SO_4)$;
   d) sodium sulfate $(Na_2SO_4)$ in an amount ranging from 1.0 wt. % to about 2.0 wt. %, based on the total weight of the dispersion, and
   e) water;
   wherein the aqueous dispersion is shelf stable and does not exhibit gelation at room temperature, and
   wherein the pH of the aqueous dispersion is about 4 or less.

2. The CPAM dispersion of claim 1, wherein
   i. said at least one acrylamide-based monomer is selected from acrylamide, methacrylamide, ethylacrylamide, crotonamide, N-methyl acrylamide, N-butyl acrylamide, N-ethyl methacrylamide, and any combination thereof;
   ii. said at least one CPAM polymer generally comprises from about 1 mol % to about 15 mol % of said cationic monomer;
   iii. said at least one CPAM polymer has an average molecular weight ranging from about 3 MDa to about 20 MDa and/or has a standard viscosity (SV), ranging from 2-7 cP when measured as 0.1% polymer in 1 M NaCl, measured with Brookfield viscometer using UL-adapter at 60 rpm and at 25° C.;
   iv. the CPAM polymer content ranges from about 10-30 wt %;
   V. said at least one cationic monomer is selected from the group consisting of 2-(dimethylamino)ethyl acrylate methyl chloride ("Q9"), acryloyloxy ethyl trimethyl ammonium chloride ("AETAC"), methacryloyloxyethyltrimethyl ammonium chloride, methacrylamidopropyl trimethyl ammonium chloride ("MAPTAC"), acrylamidopropyltrimethyl ammonium chloride, methacryloyloxy ethyldimethyl ammonium sulfate, dimethylaminoethyl acrylate, dimethylaminopropyl methacrylamide, Q6, Q6o4, diallyldimethyl ammonium chloride ("DADMAC"); dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MSQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts selected from the group consisting of acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethyl ammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkyl ammonium halides selected from the group consisting of diallyldiethyl ammonium chloride and diallyldimethyl ammonium chloride, and any combination thereof;
   vi. said cationic monomer is 2-(dimethylamino)ethyl acrylate methyl chloride ("Q9");
   vii. said at least one CPAM polymer is amphoteric and further comprises at least one anionic monomer with the proviso that the CPAM polymer has an overall positive charge;
   viii said at least one CPAM polymer is amphoteric and further comprises at least one anionic monomer with the proviso that the CPAM polymer has an overall positive charge, wherein said anionic monomer is selected from the group consisting of acrylic acid, methacrylic acid, maleic acid, itaconic acid, vinyl sulfonic acid, 2-acrylamido-2-methylpropane sulfonic acid (AMPS), acrylamido methane sulfonic acid, acrylamido ethane sulfonic acid, 2-hydroxy-3-acrylamide propane sulfonic acid, styrene sulfonic acid, vinyl phosphonic acid, and combinations thereof, as well as their corresponding water soluble or dispersible alkali metal, alkaline earth metal, and ammonium salts, and any combination thereof;
   ix. said CPAM dispersion has a dry solids content ranging from about 45 wt % to about 54 wt %;
   X. said at least one polymeric stabilizer is a low molecular weight cationic polymeric stabilizer having an average molecular weight ranging from about 100 to about 2000 kg/mol;
   xi. said at least one polymeric stabilizer is selected from the group consisting of poly(2-(dimethylamino)ethyl acrylate methyl chloride) ("pQ9"), poly(2-(dimethylamino)ethyl methacrylate methyl chloride) ("pQ6" or "pMADAM-Cl"), poly(diallyldimethyl ammonium chloride) ("pDADMAC"), and any combination thereof;
   xii. said at least one polymeric stabilizer is present at a concentration ranging from about 0.5 wt % to about 10 wt %;
   xiii. said CPAM dispersion has a dry solids content ranging from 40-60 wt %, wherein optionally said dry solids content is influenced by the CPAM polymer content, which optionally may range from about 10-30 wt %;

xiv. said polymeric stabilizer has a low molecular weight cationic polymeric stabilizer having an average molecular weight ranging from 100-2000 kg/mol;

xv. said polymeric stabilizer is selected from the group consisting of poly(2-(dimethylamino)ethyl acrylate methyl chloride) ("pQ9"), poly(2-(dimethylamino) ethyl methacrylate methyl chloride) ("pQ6" or "pMADAM-Cl"), poly(diallyldimethyl ammonium chloride) ("pDADMAC"), and any combination thereof;

xvi. said polymeric stabilizer is present at a concentration ranging from about 0.5 wt % to about 10 wt %;

xvii. said $(NH_4)_2SO_4$ is present at a concentration ranging from about 10.0 wt % to about 40.0 wt %, optionally if the polymerization reaction system contains readily precipitating hydrophobic monomers;

xviii. said CPAM dispersion further comprises an acid, optionally citric acid, adipic acid or acetic acid;

xix. said CPAM dispersion comprises an additive selected from sodium-1-naphthalene sulfonate ("SNS"), sodium xylene sulfonate ("SXS"), sodium toluene sulfonate ("STS"), and any combination thereof;

xx. the $(NH_4)_2SO_4$ is present at a concentration ranging from about 10.0 wt % to about 40.0 wt %;

xxi. the CPAM dispersion has a pH of about 4.0;

xxii. the CPAM dispersion further comprises citric acid;

xxiii. the CPAM dispersion further optionally comprises at least one additive selected from sodium-1-naphthalene sulfonate ("SNS"), sodium xylene sulfonate ("SXS"), sodium toluene sulfonate ("STS"), and any combination thereof;

xxiv. the CPAM dispersion further optionally comprises at least one co-stabilizer, optionally glycerol;

xxv. the CPAM dispersion optionally comprises at least one chelating agent, optionally EDTA-2Na;

xxvi. the CPAM dispersion does not comprise fumed silica; and/or xxvii. a combination of any two or more or (i)-(xxvi).

3. The CPAM dispersion according to claim 1, wherein:

i. said aqueous dispersion is shelf stable at room temperature for at least 1 day, at least 2 days, at least 3 days, at least 4 days, at least 5 days, at least 10 days, at least 15 days, at least 20 days, at least 25 days, at least 30 days, at least 35 days, at least 40 days, at least 45 days, at least 50 days, at least 55 days, at least 60 days, or at least 65 days, at least 2, 3, 4, 5, 6, 7, 8, 9, 10 months or up to a year or more;

ii. said aqueous dispersion is demonstrated to be shelf stable at room temperature by exposing the aqueous dispersion for 8 hrs at 40° C.+16 hrs at 5° C. and repeating this cycle, optionally two times, and further optionally centrifuging after such exposure, wherein the stable aqueous dispersion tested under such conditions exhibits no discernible effect on the dispersion, and wherein optionally the particle morphology of the aqueous dispersion tested under such temperature stability testing conditions show no discernable changes in particle morphology;

iii. said aqueous dispersion is demonstrated to be shelf stable at room temperature by centrifuging at 6000 rpm for 15 min in a Heraeus Megafuge 2.0 wherein stable aqueous dispersions will be substantially homogenous and flow smoothly after centrifugation, whereas unstable dispersions will have phase separation and may form gels; or iv. any combination of (i) to (iii).

4. The CPAM dispersion according to claim 1, wherein:

i. the CPAM dispersion is produced by a polymerization reaction comprising one or more free radical initiators, wherein the free radical initiators are all compounds which have a half-life of less than 3 hours at the selected polymerization temperature;

ii. if polymerization is started at a relatively low temperature and completed at a higher temperature, two or more initiators which decompose at different temperatures are used, i.e. an initiator is first used which decomposes at a lower temperature to initiate the polymerization followed by the addition of a second initiator which completes the polymerization and which decomposes at a higher temperature;

iii. water-soluble or water-insoluble initiators or mixtures of water-soluble or water-insoluble initiators are used to initiate polymerization;

iv. water-insoluble initiators are used which are soluble in the organic phase;

v. if polymerization includes a temperature range from about 40° C. to 60° C. then one or more of the following initiators are used: Acetylcyclohexanesulfonyl peroxide, diacetylperoxydicarbonate, dicylcohexylperoxydicarbonate, di-2-ethylhexyl peroxydicarbonate, tert-butyl perneodecanoate, 2,2-azobis-(4-methoxy-2,4-dimethylvaleronitrile), 2,2'-azobis-(2-methyl-N-phenylpropionamidine) dihydrochloride, or 2,2'-azobis-(2-methylpropionamidine) dihydrochloride;

vi. if polymerization includes a temperature range from about 60° to 80° C. then one or more of the following initiators are optionally used: tert-Butyl perpivalate, dioctanoyl or peroxide, dilauaroyl peroxide, 2,2'-azobis-(2,4-dimethylvaleronitrile);

vii. the polymerization includes a temperature range from about 40° to 60° C. and one or more of the following initiators are used: Acetylcyclohexanesulfonyl peroxide, diacetylperoxydicarbonate, dicylcohexylperoxydicarbonate, di-2-ethylhexyl peroxydicarbonate, tert-butyl perneodecanoate, 2,2-azobis-(4-methoxy-2,4-dimethylvaleronitrile), 2,2'-azobis-(2-methyl-N-phenylpropionamidine) dihydrochloride, 2,2'-azobis-(2-methylpropionamidine) dihydrochloride;

viii. the polymerization includes a temperature range from about 60° to 80° C. and one or more of the following initiators are used: tert-Butyl perpivalate, dioctanoyl peroxide, dilauaroyl peroxide, or 2,2'-azobis-(2,4-dimethylvaleronitrile); or ix. any combination of (i) to (viii).

5. A method of using a CPAM dispersion according claim 1, for any of the following:

i. sticky control in paper manufacturing;

ii. fixing in paper manufacturing;

iii. sludge dewatering;

iv. oil-water separation;

V. as a retention aid in a papermaking process; or vi. any combination of (i) to (v); and optionally wherein (1) the CPAM dispersion increases retention of starch to a formed paper web and/or board web; (2) the CPAM dispersion increases at least one strength property of the formed paper web and/or board web, selected from the group consisting of burst strength, short span compression (SCT) and/or tensile strength; or (3) a combination of (1) and (2).

6. A paper product comprising or obtained using a CPAM dispersion according to claim 1, optionally wherein said paper product:

i. Comprises at least one paper layer or web containing the CPAM dispersion;

ii. comprises the CPAM dispersion on at least one surface of the paper product;

iii. comprises one or more of paper sheeting, paperboard, tissue paper, and wall board;

iv. comprises one or more of Kraft paper, sulfite paper, semi-chemical paper, including paper produced using bleached pulp, unbleached pulp, or combinations thereof;

v. comprises a fiber-based product;

vi. comprises one or more of handsheets, board-based products, beverage carriers, toweling, milk and juice cartons, food trays, paper bags, liner board for corrugated containers, packaging board grade, and tissue and towel grade, paper materials, paper towels, diapers, sanitary napkins, training pants, pantiliners, incontinence briefs, tampons, pee pads, litter box liners, coffee filters, air filters, dryer pads, floor cleaning pads, absorbent facial tissue, absorbent bathroom tissue, napkins, wrapping paper, and/or other paperboard products, cartons, and bag paper;

vii. comprises cellulose paperboard webs which optionally comprise predominantly cellulose fibers;

viii. comprises cellulose fibers and from about 0.02 wt % to about 10 wt % CPAM dispersion by dry weight of cellulose fibers;

ix. comprises an improved paper strength, optionally determined by STFI testing, compared to a paper product that does not comprise said CPAM dispersion;

x. comprises an improved paper strength, optionally determined by burst strength testing, compared to a paper product that does not comprise said CPAM dispersion; and/or xi. any combination of two or more of (i)-(x).

7. A method of papermaking, wherein said method comprises adding one or more CPAM dispersions according to claim 1 during the papermaking method in an amount effective to increase the dry strength of paper products produced by said method, wherein:

i. the one or more CPAM dispersions is added to a composition comprising fiber and/or pulp used in the method prior to the paper product being formed; and/or ii. the one or more CPAM dispersions is added to one or more surfaces of the paper product after the paper product is formed.

8. A method of manufacturing one or more paper products, wherein said method comprises:

i. providing a composition comprising predominantly cellulose fibers;

ii. adding a predetermined quantity of one or more CPAM dispersions obtained according to claim 1; and iii. forming the desired paper product.

9. A method for strengthening paper, comprising contacting pulp fibers with a strengthening resin comprising at least one CPAM dispersion according to claim 1, and at least partially curing the strengthening resin contacting the pulp fibers to produce a paper product of enhanced strength.

10. The method according to claim 7, wherein:

i. said CPAM dispersion is added at the wet end of a paper-making facility to a cellulose fiber suspension;

ii. said CPAM dispersion is added in an amount from about 0.02 wt % to about 10 wt % by dry weight of the cellulose fibers;

iii. said CPAM dispersion is added before, during and/or after the paper product is formed;

iv. said CPAM dispersion is added to one or more surfaces of the paper product after the paper product is formed;

v. said CPAM dispersion provides a paper strength enhancement to the paper product for at least one strength property, selected from the group consisting of burst strength, short span compression (SCT) and/or tensile strength, optionally determined by STFI testing;

vi. said CPAM dispersion provides a paper strength enhancement to the paper product for at least one strength property, selected from the group consisting of burst strength, short span compression (SCT) and/or tensile strength, optionally determined by burst strength testing;

vii. the paper product comprises one or more of handsheets, board-based products, beverage carriers, toweling, milk and juice cartons, food trays, paper bags, liner board for corrugated containers, packaging board grade, and tissue and towel grade, paper materials, paper towels, diapers, sanitary napkins, training pants, pantiliners, incontinence briefs, tampons, pee pads, litter box liners, coffee filters, air filters, dryer pads, floor cleaning pads, absorbent facial tissue, absorbent bathroom tissue, napkins, wrapping paper, and/or other paperboard products, cartons, and bag paper;

viii the paper product comprises cellulose paperboard webs which optionally comprise predominantly cellulose fibers; and/or ix. any combination of two or more of (i)-(viii).

11. A method for preparing an aqueous CPAM dispersion according to claim 1, comprising: polymerizing said at least one acrylamide-based monomer and said at least one cationic monomer in a polymerization reaction comprising water, said acrylamide-based monomer, said cationic monomer, said at least one polymeric stabilizer, $(NH_4)_2SO_4$ ("ammonium sulfate"), $Na_2SO_4$ ("sodium sulfate"), and at least one polymerization initiator to form said CPAM dispersion comprising said at least one CPAM polymer, wherein:

the $Na_2SO_4$ is present at a concentration which is less than about 3.0 wt %;

the method optionally further comprises measuring pH of the polymerization reaction and adjusting the pH to about 4 by adding at least one acid; and wherein the resultant aqueous CPAM dispersion is shelf stable and does not exhibit gelation at room temperature;

further optionally wherein:

i. The polymerizing is performed in a reaction vessel and the method further comprises purging the reaction vessel and/or the polymerization reaction with nitrogen;

ii. the polymerizing further comprises agitation of the polymerization reaction at about 200-300 rpm;

iii. the polymerizing is performed at a controlled temperature ranging from about 38° C. to about 50° C.;

iv. the pH is adjusted to about 4.0;

v. said at least one acid comprises citric acid, adipic acid or acetic acid; or comprises citric acid;

vi. said at least one initiator is selected from an azo compound selected from the group consisting of 2,2'-azobis(2-amidinopropane) dihydrochloride, 2,2'-azobis[2-(2-imidazolin-2-yl) propane] dihydrochloride, 2,2'-azobis(isobutyronitrile) (AIBN), 2,2'-azobis(2,4-dimethylvaleronitrile) (AIVN), 2,2'-azobis(2-methylpropionamidine) dihydrochloride, or comprises a peroxide initiator selected from the group consisting of benzoyl peroxide, t-butyl peroxide, t-butyl hydroperoxide and t-butyl perbenzoate or comprises sodium bromate/sulfur dioxide, potassium persulfate/sodium sulfite, or ammonium persulfate/sodium sulfite, or comprises a combination of any of the foregoing;

vii. said initiator is 2,2'-azobis[2-(2-imidazolin-2-yl) propane] dihydrochloride;

viii. progress of the polymerization reaction is monitored;

ix. the at least one initiator is added in 1-5 or more doses throughout the polymerization reaction;

x. the total amount of the at least one initiator added during the polymerization reaction generally ranges from about 200 to about 600 ppm per monomer; and/or xi. any combination of two or more of (i)-(x).

12. A method for preparing an aqueous CPAM dispersion according to claim 1, comprising: combining water, said at least one CPAM polymer, said at least one polymeric stabilizer, $(NH_4)_2SO_4$ ("ammonium sulfate"), and $Na_2SO_4$ ("sodium sulfate"), wherein:

the $Na_2SO_4$ is present at a concentration which is less than about 3.0 wt %, or at least 1.0 wt % and less than 2.0 wt %;

the method further optionally comprises measuring pH of the CPAM dispersion and adjusting the pH to about 4 by adding at least one acid; and wherein the method results in an aqueous CPAM dispersion which is shelf stable and does not exhibit gelation at room temperature.

13. An aqueous CPAM dispersion prepared by a method according to claim 11.

14. A paper product comprising a CPAM dispersion prepared by a method according to claim 11.

15. The aqueous CPAM dispersion of claim 1, wherein in step d) the amount of $Na_2SO_4$ is less than 2.0 wt. % based on the total weight of the dispersion.

16. The method of claim 11, wherein the amount of $Na_2SO_4$ is at least 1.0 wt % and less than 2.0 wt %.

* * * * *